(12) United States Patent
Ostler

(10) Patent No.: US 10,265,615 B1
(45) Date of Patent: Apr. 23, 2019

(54) AWARENESS GAME

(71) Applicant: David Lynn Ostler, Ogden, UT (US)

(72) Inventor: David Lynn Ostler, Ogden, UT (US)

(*) Notice: Subject to any disclaimer, the term of this patent is extended or adjusted under 35 U.S.C. 154(b) by 350 days.

(21) Appl. No.: 15/157,793

(22) Filed: May 18, 2016

Related U.S. Application Data

(60) Provisional application No. 62/163,858, filed on May 19, 2015.

(51) Int. Cl.
  *A63F 13/00* (2014.01)
  *A63F 9/18* (2006.01)
  *A63F 13/92* (2014.01)

(52) U.S. Cl.
  CPC ............. *A63F 9/183* (2013.01); *A63F 9/18* (2013.01); *A63F 13/92* (2014.09)

(58) Field of Classification Search
  None
  See application file for complete search history.

(56) References Cited

U.S. PATENT DOCUMENTS

| | | | |
|---|---|---|---|
| 4,682,956 A | 8/1987 | Krane | |
| 5,480,157 A | 1/1996 | Plummer | |
| 6,139,016 A | 10/2000 | Plato | |
| 6,328,308 B1 | 12/2001 | Kirby | |
| 7,320,467 B2 * | 1/2008 | Matilla | A63F 3/04 273/273 |
| 7,694,974 B1 | 4/2010 | Fowler-Gerhing et al. | |
| 2016/0078776 A1 * | 3/2016 | Kiely | G09B 17/00 434/129 |
| 2018/0109637 A1 * | 4/2018 | Uchida | H04L 67/26 |

OTHER PUBLICATIONS

U.S. Appl. No. 13/555,024, filed Jul. 20, 2012, Ostler.

* cited by examiner

*Primary Examiner* — Sunit Pandya

(57) ABSTRACT

A game for multiple players in which a player wins a round of play by predicting another player's perception of the reaction of a person, fictional character, or personified thing to performing a described activity, being in a described situation, or being characterized as described.

14 Claims, 15 Drawing Sheets

Fig. 1

00. If P _____ were a Shakespearean actor/actress, his/her favorite role would be:

1. Hamlet in "Hamlet"
2. Ophelia in "Hamlet"
3. One of the gravediggers in "Hamlet"
4. Claudius, King of Denmark, Hamlet's stepfather
5. King Lear in "King Lear"
6. Romeo in "Romeo and Juliet"
7. Juliet in "Romeo and Juliet"
8. Macbeth in "McBeth"
9. Lady Macbeth in "Macbeth"
10. Othello in "Othello"
11. Desdemona, wife to Othello, in "Othello"
12. Iago in "Othello"
13. Julius Caesar in "Julius Caesar"
14. Cicero in "Julius Caesar"
15. Marcus Antonius in "Julius Caesar"
16. Marcus Brutus in "Julius Caesar"
17. Egeus, father of Hermia, in "A Midsummer's Night's Dream"
18. Hermia in "A Midsummer's Night's Dream"
19. Lysander in "A Midsummer's Night's Dream"
20. Demetrius in "A Midsummer's Night's Dream"

Fig. 2

122. An acquaintance compliments P_____ on his/her a) needle work piece  b) artistic taste  c) beautiful dog  d) shirt  e) house  f) sense of humor  g) golf swing  h) hair  i) artistic talent  j) diction  k) high moral character.

P_____'s reply is most likely to be:

1. Oh really. I've never thought about it.
2. I should hope so. I've worked enough at it.
3. Oh, you really think so?
5. You are so kind.
6. Oh no, it's terrible. You don't have to humor me.
7. Thank you.
8. Give me a break.
9. Are you kidding me?

Fig. 3

100. P1 _____ and P2 _____ are snowed-in alone together in a mountain cabin for two months. They do not lack for heat, food, or water. The likeliest outcome is:

1. a homicide.

2. a pregnancy.

3. the end of a friendship.

4. the deepening of a friendship.

5. the beginning of a romantic relationship.

6. the end of a romantic relationship.

7. two lunatics lost in the woods.

8. a new country folk duo.

9. a new autobiographical book entitled "A Dream Come True".

10. a new autobiographical book entitled "I Survived Two Months in Hell".

11. a new autobiographical book entitled "The Power of Friendship".

12. a gay gone straight.

13. a straight gone gay.

14. a final truce after a fight almost unto death.

15. a realization that a wished-for dream was a wish for a nightmare.

Fig. 4

123. P1 _____ and P2i _____ are snowed in alone together in a mountain cabin for two months. They do not lack heat, food, or water. The likeliest outcome is:

1. a homicide.
2. a pregnancy.
3. the end of a friendship.
4. the deepening of a friendship.
5. the beginning of a romantic relationship.
6. the end of a romantic relationship.
7. two lunatics lost in the woods.
8. a new country folk duo.
9. a new autobiographical book entitled "A Dream Come True".
10. a new autobiographical book entitled "I Survived Two Months in Hell".
11. a new autobiographical book entitled "The Power of Friendship".
12. a gay gone straight.
13. a straight gone gay.
14. a final truce after a fight almost unto death.
15. a realization that a wished-for dream was a wish for a nightmare.

Fig. 5

124. It looks as if P _____ and pi _____ will be snowed-in, just the two of them, in a mountain cabin for two months. There are plenty of provisions to get them through the two months. P _____ thinks:

1. "I'm going to kill him/her."
2. "I hope this doesn't result in a pregnancy."
3. "So much for friendship."
4. "This could be the beginning of a long and solid friendship."
5. "Finally we can talk, and he/she will not be able to run away."
6. "I think we would make a great country-folk singing duo."
7. "My dream come true!"
8. "I'm going to write a book entitled "Two Months in Hell."
9. "I'll never feel true passion again."
10. I feel like a school kid in love."
11. "I thought this would be the realization of a dream. Now that I'm living it, it seems a nightmare."
12. "My God! Will he/she ever shut-up?"
13. "... and though I be led through the shadow of death ..."

Fig. 6

125. If P1i _____ and P2i _____ were matched-up as a team for a wheelbarrow race, with P1 being the wheelbarrow, and P2 holding the handles of the wheelbarrow (P1's ankles):

1. P1 would think, "We'll smoke 'em", while P2 would think, "Oh dear, I've got Mr./Ms. Macho."

2. P1 and P2 would think, "Our job assignments are backwards."

3. P1 would think, "I'm too old for this", while P2 would think, "You're too old for this."

4. P1 and P2 would think, "We're too old for this!"

5. P1 would think, "All the work I put into staying in shape, and I get matched-up with him/her," while P2 would think, "I don't care if I win or not. I just don't want to be yelled at."

6. P1 and P2 would think, "Let's do it. We'll smoke 'em!"

7. P1 and P2 would think, "I quit!"

Fig. 7

126. If P1i _____ and P2i _____ were matched-up as a team for a wheelbarrow race, with P1 being the wheelbarrow, and P2 holding the handles of the wheelbarrow (P1's ankles):

P1 would think:

1. "I'm too fat for this!"
    2. "I'm too dignified for this."
    3. "I'm too cool for this."
    4. "What fun!"
    5. "I want to die!"
    6. "If P2 pushes me onto my belly, he/she will regret it.

P2 would think:

7. "You're too fat for this!"
    8. "At least I'm not you!"
    9. "We'll see if your arms can keep-up to my legs."
    10. "I don't want to look at that!"
    11. "Umm! Not a bad view!"
    12. "It's not my fault if I drop you!"

Fig. 8

066. P _____ has a neighbor, pi _____ who often stops by, and talks about a) politics, b) sports, c) nature walks, c) kids and family, d) the most recent party to which she/he has been invited. While pi _____ can go on and on with his/her opinions, and observations, he/she is not interested in P _____'s observations or opinions. P _____ is likely to think:

1. I love people who share.
2. Why wasn't I invited to the party?
3. As long as he doesn't go on too long.
4. I should be paid to listen to this.
5. I wish I knew how to cut a conversation short without seeming rude.
6. If this goes on long, I'm going to just say, "I do not really care about all that".
7. He's mistaken if he thinks he is going to tell me more than I'm going to tell him.
8. It's so interesting to listen to someone who is so self-absorbed.
9. When you live in a town like mine, you take whatever entertainment you can get.

a) Pi _____ has met X, on a dating web-site. P has never seen X other than seeing his/her website picture. X looks attractive enough, but P has not had much time to learn about X. X invites P out to dinner at a new restaurant that has received rave reviews. P has wanted to dine at this restaurant ever since he/she first heard about it.
   P is most likely to:

1. think, "Nothing ventured, nothing gained", and just pick-up X, or have X pick-up him/her.
2. tell X to met him her in the restaurant lobby, and then wait inside an adjoining business from which he/she can watch the restaurant's parking lot and see X and his/her car before he/she goes inside.
3. tell X that he/she would rather meet in a coffee shop or at the drug store soda counter.

b) By chance, P sees X in a public place before the arranged date. X is driving an old beat-up pickup.
   P is most likely to:

1. decide, "If that's his/her only vehicle forget it, I'm out of here."
2. think, "Cool. I just wish he/she were wearing a cowboy hat."
3. think, "I love old trucks."
4. think, "Since this is our first "date", I've got to assume that's his/her best vehicle. What a loser!"

c) By chance, P sees X in a public place before the arranged date. X  a) is wearing a colorful, loose-fitting, African style dress called a MuMu, b) has a mohawk haircut
   P is most likely to:

1. decide, "Forget it. I'm out of here."
2. think, "Cool. I like a man/woman in touch with his/her masculine/feminine side."
3. think, "Cool. But not in a public restaurant!"
4. think, "I'm all for tolerance and exploring new ideas, but it's our first meeting, and this guy/gal looks like he/she is ready to give lectures. Sorry, I'm out of here."
5. think, "Cool. Whatever he/she is, he/she is not a nerd."
6. think, "No way! I don't go for this cross-over of sexual roles."

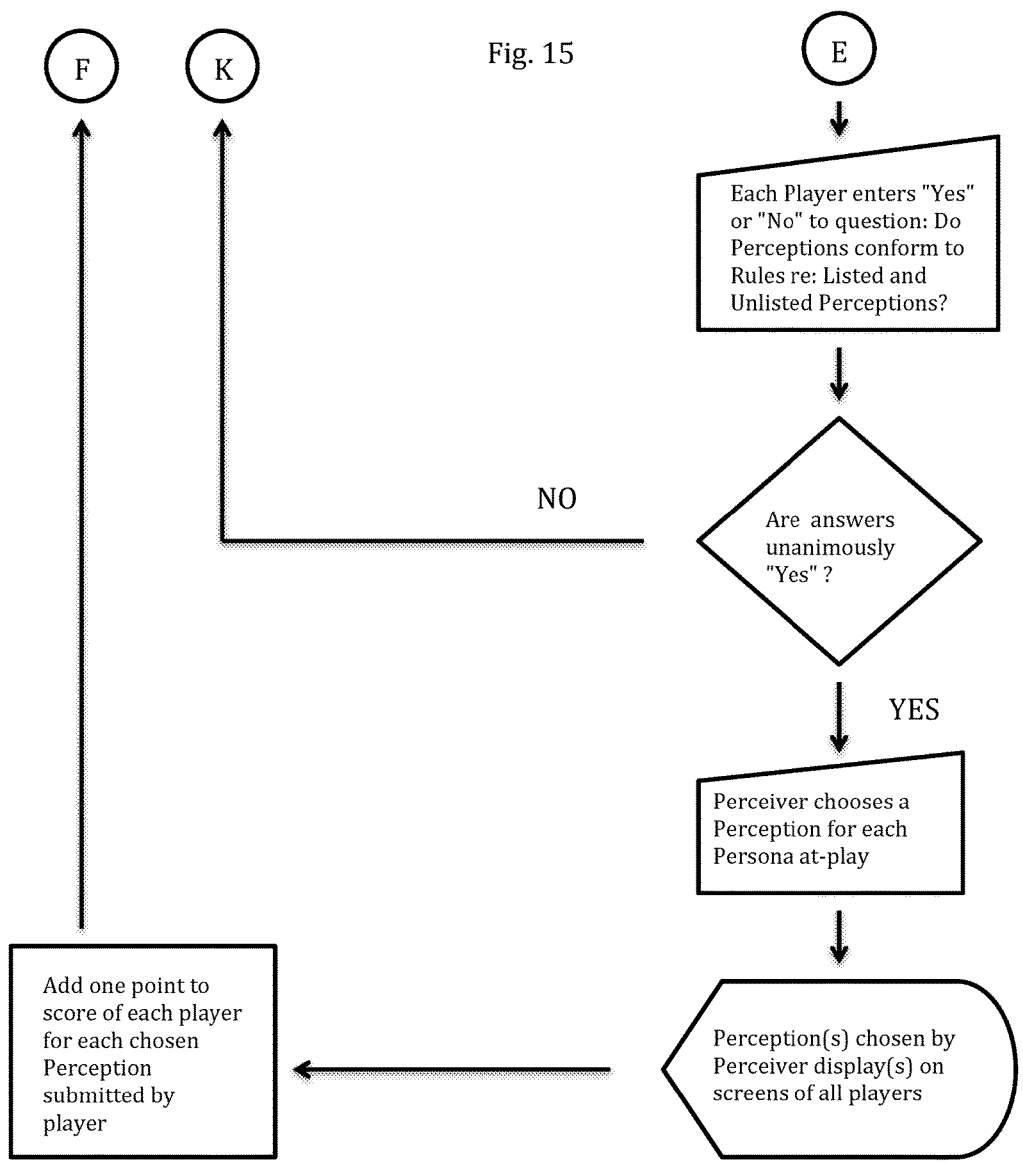

AWARENESS GAME

BACKGROUND

Prior Art

"The Awareness Game" is a modification and expansion of the method of the Second Embodiment of Social Awareness Card Game, U.S. patent application Ser. No. 13/555,024. "Social Awareness Card Game" has the stated objectives of being entertaining and enlightening as the game determines which player best perceives how other player's perceive others. It is a game that often has outcomes that are entertaining in their unexpectedness, and revealing of the players' perceptions of themselves, and others. The card game has the stated goal that "the game should reward more than just a knowledge of how another player perceives himself. It should also reward knowledge of how other players perceive the perspectives of other persons. The patent application for the card game states, "the method of play should be as simple as possible, without complicated rules and apparatus that divert the player's attention from observing, and reflecting on how other players perceive themselves and others."

Social Awareness Card Game begins with the creation of a list of persons approved by all players to play the part of "Personas" in the game. These persons can be players or non-players. Persons are "known of" or "known by" all players. The Personas need not be present. The list of names of Personas is called the "Persona List".

At the beginning of each round, the name of a Persona is randomly selected from the Persona List to be the Persona for the round. This is done by drawing cards that are numbered to correspond to the numbers assigned to the names of Personas listed on the Persona List.

Also, at the beginning of each round, an "Incomplete Performance" is selected by drawing card from a deck of Performance Cards. An Incomplete Performance is printed on the face of each card in the Performance Card Deck. An Incomplete Performance always lacks the name of a Persona, and sometimes lacks other wording. The player designated the "Initiator" for the round selects wording if required. With these selected words, and the name of the Persona for the round, the Performance is complete. A "Complete Performance" describes an activity that the Persona(s) is imagined performing, or a situation in which the Persona is imagined to be, or a characterization by which the Persona is imagined to be characterized.

Each player independently makes an assessment of what another player, the Perceiver for that round, will perceive as the attitude, philosophy, or motto of the Persona in the Performance. These perceived attitudes, philosophies, or mottos are called Perceptions. One Perception, unique within the deck, is printed on each Perception Card of a Perception Card Deck.

Before the first round of play, an equal number of Perception Cards are dealt randomly to each player. On the first round, and on each round thereafter, each player, except the Perceiver, plays a Perception Card from her hand. From the Perception Cards played, the Perceiver chooses the card most closely stating his perception of the Persona's attitude, philosophy, or motto while the Persona is performing the activity, being in the situation, or being characterized as described by the Complete Performance. The player playing the card chosen by the Perceiver wins a point.

Each round of play, excepting the first, the winner of the previous round of play assumes the role of Initiator. The Initiator can be expected to make word choices that construct a Performance for which she has a Perception Card likely to be chosen by the Perceiver. If the Initiator's submitted card is chosen, she wins a point, and continues as the Initiator during the next round.

After each round of play, the role of Perceiver passes to the player immediately to the left of the Perceiver. If the player to the Perceiver's left was the winner of the game, and therefore, the Initiator of the next round, the role of Perceiver passes to the player left of the new Initiator. Rounds continue until a player accumulates an agreed upon number of points to win the game.

Social Awareness Card Game attains its stated objectives, if the cards of the game are composed with enough deliberation, and ingenuity. But even if this is done, the game has significant limitations. Many of these limitations result from the game being played with cards. These cards are of three types, Performance, Perception, and Persona. The Performance and Perception cards are the source of the game's limitations.

Performances are the innumerable situations describing the Persona being in a described situation, performing a described activity, or being characterized in a described manner. The number of possible Performances is only limited by the number of Performance cards, but for any round only one Performance is used. This is the Performance stated on the Performance Card randomly drawn for the round.

Perceptions are the innumerable possible perceptions a player might have of the Perceiver's perception of the Persona's attitude, philosophy, or motto while the Persona is in a situation, performing an activity, or being characterized, as described by a Performance. As with Performances, the number of possible Perceptions is only limited by the number of Perception Cards.

Hence, for each Persona, in any round of play, there is only one Performance, while the number of Perceptions is the number of Perception cards dealt to each player times the number of players. Even though many Perceptions can apply to more than one Performance, it will often be the case that many of the Perceptions, held in the hands of players in a round of play, will not be relevant to the Performance of the round. In fact, unless the Perception cards are deliberately composed to counter it, it is and possible that all of the Perception cards in the hand of a player will be irrelevant to the Performance of the round.

There are two means to reduce the number of irrelevant Perception cards. One is to make the Perceptions very general and vague such as: "It could be worse." or "What's it to you?" These reactions may be somewhat amusing, as in the game "8 Ball" when players ask a question, shake the ball, and read the words that float to the top. The second means is to compose the Performances so that they pertain to a limited area of human experience such as "men/women relationships". Both of these means are used in composing and editing the cards of Social Awareness Card Game. The result is a game that is often amusing, and sometimes illuminating, but can also be insipid, and narrow in scope.

Another limitation inherent to using cards is the limited space on the face of a card. The limited area available for text limits the degree to which a Performance or Perception can be stated completely and with specificity. Sometimes it is not possible to describe, in the space available, the complicated situations of some Performances, nor the thoughts, and emotions making-up complicated Perceptions.

The use of cards also limits fair competition. A player's possible choices of Perceptions are limited in scope and number to the cards he is randomly dealt. There is no method to ensure that players' hands are comparable to each other in the selection presented.

The use of cards also opens-up the possibility of disputes as to who submitted a Perception to the Perceiver. It is possible for a player to forget the Perception he submitted, or deliberately lie as to the Perception he submitted. A resulting dispute can be difficult to resolve because Perception cards are played facedown, leaving only the player who played a card with first-hand knowledge of who played it.

Also, Social Awareness Card Game is limited by its description of what a Perception is: The player's perception of the Perceiver's perception of the Persona's attitude, philosophy, or motto when the Persona is performing the described activity, in the described situation, or is characterized as described. In real life, Perceptions are not always adequately described by language. Sometimes a Perception is ineffable, or almost entirely emotional, and is best expressed in ways that go beyond descriptive statement.

These limitations add-up to one over-arching limitation: The method of The Awareness Card Game makes it less than likely that a player can submit the Perception he wishes to submit, leaving the outcome of the game too dependent upon the luck of the draw.

SUMMARY

Many of the limitations of Social Awareness Card Game derive from its method of using cards to present Performances and Perceptions. The method of The Awareness Game avoids these limitations by presenting the text of Performances and Perceptions on sheets of paper or digital screens. This method allows for many more Performances, and Perceptions. At the same time, the method allows these Performances and Perceptions to be more complex in concept and detail.

Format Advantages

The text used in playing the game can be printed on individual sheets of paper, which can be bound into looseleafs or books. Text can also be displayed on electronic devices such as e-books, tablets, computers, and smart phones. Play on computerized devices opens-up the possibility of players playing from locations that are remote from each other.

The format of text on digital screen allows for the use of computer technology that makes game play easier. This ease of use derives from the method of The Awareness Game, which is based on making selections. Some of these selections are made by random method, others by personal choice. When selections are made by random method, the use of computer technology eliminates the need of using hand-held apparatus such as decks of cards, and dice. When selections are made by personal choice, the text of the full selection of choices for a round of play can display on the screen of each individual player. This eliminates the need to handle multiple sheets of paper, books, and cards.

Text on paper or screen eliminates the practical limit on the number of Perceptions. When each Perception must be printed on a separate playing card, there is a limit to the number of cards that can be physically handled by players. There is no such limit when Perceptions are presented on computer screen, or paper. The result is a much larger selection of Perceptions from which to choose.

Also, space available for text is no longer limited to the space on the face of a playing card. In fact, space for text is essentially unlimited, allowing Performances, and Perceptions to be stated as fully, and in as much detail as a game designer desires.

The presentation of irrelevant choices is eliminated. Text printed on paper, or text displayed on digital screens allows for presenting to each player a list of Perceptions, in which each Perception is relevant to the Performance of the round. These Performances and Perceptions can be listed in a "List of Incomplete Performances and Concomitant Perceptions", in which following each listed Incomplete Performance is a list of numbered "Listed Perceptions".

The presentation to players of less than comparable selections of Perceptions is eliminated. The player's choice of Perceptions is no longer a matter of chance. Each player has a selection of Perceptions that is not just comparable to that of other players, but exactly the same.

Whether Perceptions are submitted by hand, or transmitted from a computer, the method of The Awareness Game can allow each player to submit a remembered, or self-composed Perception(s) for a round of play. These "Unlisted Perceptions" can be a player's exact description of the Perception the player perceives the Perceiver to have toward the Persona performing, or experiencing the Performance.

In fact, the majority of the players could decide that only Unlisted Perceptions are allowable in a game. In this case the game can be played with a "List of Performances Concomitant Perceptions", with the players being required to create their own Perceptions.

Performances

In The Awareness Game, the definition of a Performance is the same as in the Social Awareness Card Game, to wit, the Persona being described as having a characteristic, being in a particular described situation, or performing a specific action. This definition allows for a wide range of scenarios in which to imagine the Persona. Yet, this range of scenarios can be even wider when the descriptions of Performances are made with text on paper, or digital screen, rather than on the limited space afforded by the face of a hand-held card.

Selecting a Performance

Unlike Social Awareness Card Game, in the Awareness Game players can decide by majority rule that a player chooses the Performance for each round. The player making the choice can be either the Initiator of the round, or the player whose turn is a predetermined number or turns after the Perceiver's turn.

Sequential Performances

Most Performances are intended to be selected randomly for a round of play, but "Sequential Performances" are played only after one or more other Performances have been played. They create elaborations of the previously described Performance(s), which can include additional descriptions of Performances, and different or, additional Personas.

Each Sequential Performance has its own Concomitant Perceptions. Sequential Performances are recognized on the List of Incomplete Performances and Concomitant Perceptions by their having the same number as the previously listed Performance, but having in addition a letter designation.

There may be one, or several Sequential Performances following a Performance. Unless Variable Rule requires otherwise, each Sequential Performance is played using a new Perceiver and a new Initiator as determined by the same rules applying to Performances that are not sequential. This rule derives from considerations of fairness. If a Perceiver for a Performance that preceded a Sequential Performance remained the Perceiver for the Sequential Performance he would unfairly lose a turn, and thereby lose an opportunity to win points. Conversely, if an Initiator for a Performance that preceded a Sequential Performance did not win the Performance but, nonetheless, retained the strategic advantage of being the Initiator for the Sequential Performance, the advantage would be unearned.

Personas

As in the Social Awareness Card Game, each Persona must be approved by all players. Unlike the Social Awareness Card Game, The Awareness Game allows a Performance to have more than one Persona in a Performance. The extra Persona(s) can be used solely in order to construct the situation making-up a Performance. Such a Persona is "not-at-play". Players do not submit a Perception for Personas not-at-play. Alternatively, the extra Persona(s) can be "at-play", in which case each player, excepting the Perceiver, will submit a Perception relating to each Persona at-play.

The Awareness Game allows for a wider variety of Personas than Social Awareness Card Game. Beyond persons known, or known-of by all players, Personas can be persons past and present, real, imaginary, or abstract. Examples are friends, family, acquaintances, historical figures, characters in fictional literature and movies, corporations, inanimate objects, cartoon characters, and animals.

Of course, when each player accepts or rejects a proposed Persona as eligible to be used in a game, the List of Incomplete Performances and Concomitant Perceptions should be considered. Each List will have been drafted with a particular type of Persona in mind. In cases in which these Performances were constructed with other than known actual persons in mind, the type or types of Persona compatible to the List of Performances and Concomitant Perceptions should be stated to the players at the beginning of the game. If the Personas are chosen without regard to the Incomplete Performances into which they are to be inserted, the resulting Complete Performances can be bizarre, or even nonsensical.

In Social Awareness Card Game, for a person to be a Persona in a game, there must be unanimous approval of the players. This assures "that all players are on an equal footing" in their knowledge of the Personas. This rule and the rationale for it, also applies to The Awareness Game. But there is another important consideration. Even if only one player recognizes that a proposed Persona does not "fit" the List of Performances and Concomitant Perceptions, that player can eliminate the proposed Persona. This helps prevent pairings of Personas and Performances from being outlandish, unless all players wish them to be.

After all players have agreed to the Personas for the game, a player, or a computerized system assigns each Persona on the resulting list a unique designation. This could be a number, a letter, or a particular card in a deck of cards. The resulting list is the "Persona List" from which Personas are randomly or deliberately selected. Random selection can be done by drawing a card from a "Persona Deck", which is a deck of cards in which each card in the deck is uniquely assigned to a Persona on the Persona List. In the alternative, a random number generator can be used to randomly select a number uniquely associated to a Persona on the Persona List.

The Specified Player for Submitting Perceptions to the Perceiver

In "Social Awareness Card Game", the Perception cards are gathered by the Initiator, and then read by the Initiator to the Perceiver. In "The Awareness Game" Perceptions are submitted to a "Specified Player" who has the responsibility to present all of the submitted Perceptions to the Perceiver in such manner that the Perceiver can not tell who submitted any of the Perceptions.

When playing with interconnected computerized devices communicating through a server, such as smartphones, there is no Specified Player for submitting Perceptions to the Perceiver. Each player merely enters her choice of Perception. The system then presents the Perceptions to the Perceiver's screen without indicating the identity of the sender.

Perceiver's Perception of Persona's Reaction

The method of The Awareness Game expands the definition of a Perception used in Social Awareness Card Game. In the card game each player attempts to submit a Perception that is closest to being the Perceiver's perception of the Persona's attitude, philosophy, or motto when in the described situation, performing the described activity, or being characterized as described. Under the expanded definition a Perception is the Perceiver's perception of the "Persona's Reaction" to performing a described activity, being in a described situation, or being characterized as described. Under this expanded definition of a Perception, the Persona's Reaction comprises statements made by words, physical actions, or exclamations, that communicate or describe attitudes, philosophies, mottos, expressions of thought or emotion, observations, and assertions of fact, belief, resolve, policy, or principle.

Perceptions of the Persona's most likely reaction to a Performance comprise statements and expressions of emotion which can be as simple as a grunt, or an exclamation, or as complex as those described in literary art, or scientific psychological literature. Perceptions can also be expressed by physical action. Examples are "glaring without saying a word", "shrugging shoulders", or "getting out of town."

Perceptions can also be implied by facts indicating that the Persona has done something in reaction to the Performance. For example, the Performance might be "going through a winter without enough food to keep from going hungry." One of the Perception choices concomitant to this Performance, might be "cupboards stocked with food at the beginning of each following winter." Another example of a Performance might be: "Persona#1 meets Persona#2. Due to events beyond their control, the two persons share each other's exclusive company for a month." A Concomitant Perception indicating the reaction of the Personas to the Performance could be: "At the end of this month of being together, the two are very happy and engaged to be married."

Constructing a Performance

In every round, the Performance will have at least one Persona at-play. When there are multiple Personas at-play the Performance can be structured so that one Perception describes the common Perception of two or more Personas, or it can be structured so that each individual Persona has his own Perception.

A Performance is always incomplete as presented in The List of Incomplete Performances and Concomitant Perceptions. This is because all Incomplete Performances at a minimum lack a Persona at-play. Unlike the card game, in The Awareness Game the Persona(s) at-play are not always randomly selected. Indicia within the Incomplete Performance may direct the Initiator to choose a Persona(s) at-play from the Persona List.

Performances may also require the insertion of Persona(s) not-at-play. As with Personas at-play, Personas not-at-play are selected either randomly or by the Initiator, as directed by the indicia within the Incomplete Performance.

The name of a Persona is "inserted" into the statement of the Performance at a location indicated by a blank underlined space. Indicia direct whether a Persona is to be inserted is at-play, or not-at-play, and whether the Persona is to be chosen by a random method, or chosen by the Initiator. These indicia are letters and numbers, presented before or after an underlined blank space.

Incomplete Performances may require that a word choice(s) be made. There is no underlined space to indicate the location of a word choice. The location for the word or words chosen is the location of the choices within the Incomplete Performance. The indicia for word choices are the word choices themselves, each choice being preceded by a letter or number designation.

It is not intended that the word "inserted" direct that the Persona's name, or the choice of wording be literally inscribed, or displayed into a Performance. Selected text may be displayed on a screen, the letter of a word choice may be circled, a Persona's name may be written above a blank underlined space, but the actual presentation of text is not necessary for selected text to be considered "inserted" into the Incomplete Performance. Selected text is understood to be located at the displayed empty underlined space, or at the location that choices are listed. A word, or phrase is considered "inserted", and a part of the Complete Performance upon being selected.

After an Incomplete Performance has been randomly selected, it can be determine, by inspection of the Incomplete Performance, whether a Persona is to be chosen by the Initiator's personal choice, or by random method. Letter indicia will be immediately before, or after the space. The letter "p", in either upper or lower case, denotes that a Persona is to be inserted. An upper case "P" denotes a Persona at-play. A lower case "p" denotes a Persona not-at-play. An "i" following a "p" indicates that the Persona is to be chosen by the Initiator. If there is no "i", this indicates that the Persona is to be chosen by a random method.

Although not required by rule, strategy dictates that the Initiator should wait for randomly determined Persona(s) to be inserted before making a choice of wording, or a choice of Persona(s). In this way the Initiator is better positioned to choose wording, and Persona(s) that construct a Complete Performance for which she can more probably predict the Perception to be chosen by the Perceiver. The importance of this strategy is magnified by the fact that the winner of a round becomes the Initiator for the next round.

Individual Game Actions

"Individual Game Actions" are actions performed by a player with the intent of improving the chances of the player winning the round of play. Individual Game Actions comprise a player: 1) choosing a Performance for a round of play, 2) choosing Persona(s) when constructing a performance, 3) choosing text when constructing a Performance, 4) choosing a Perception to submit to the Perceiver, 5) executing a betting action. Only an individual player or a team acting as a player can perform Individual Game Actions.

Routine Game Actions

"Routine Game Actions" are actions performed by a player or by the interconnected computerized system in order for play to advance in conformance with the rules of the game. Unlike Individual Game Action, Routine Game Actions are not performed with the intent of improving any player's chances of winning a round of play. Routine Game Actions must be performed each game, and each round, by a player or players, or by the computerized system. Any Routine Game Action that is not done automatically by a game system may be done by any assigned or "specified" player. For example, some, or all Routine Game Actions may be assigned to the Initiator of the round, or left to volunteering players, "Volunteer(s)". In either instance the player responsible for performing the Routine Action is a "Specified Player".

Routine Game Actions comprise: 1) randomly choosing a Performance, or a Persona, by using cards, or a game program using a random number generation to randomly select a Performance or Persona from inputted data, 2) accepting and holding paper on which is written Perceptions submitted by players, or a game system storing inputted Perceptions in system memory 3) handing a copy of written submitted Perceptions to the Perceiver, or transmitting Perceptions inputted by players to the Perceiver's computerized device, 4) inputting names of players, names of Personas, and the sequence of players' turns into system memory, or writing the same on paper, 5) recording "Variable Rules" on paper and then enforcing those rules on players, or setting computer controls so that the game program conforms to inputted Variable Rules, 6) a player adding to a game score on paper, or a computer adding to a game score stored in memory, 7) a player reading out-loud to the Perceiver the Perceptions submitted by players, or a game system displaying the inputted Perceptions on the Perceiver's screen, 6) a Perceiver choosing a Perception(s) from those submitted by players.

Variable Rules

Variable Rules are alternative rules for playing the game. A Variable Rule becomes a rule of a game when the majority of players agree that the rule should be chosen from two or more alternative rules. An example is choosing between the Initiator, and a Volunteer to perform a Routine Game Action. Variable Rules are decided upon before game play begins.

Awarding Points, and Determining the Initiator and the Perceiver

One aspect of Social Awareness Card Game deriving from its use of cards is that there is no possibility for a tie round. Each Perception card is unique and can be in the hand of only one player. In contrast, The Awareness Game allows that any listed Perception may be played by any player. This allows for more than one player to submit the same Perception. This can result in two or more players submitting the same chosen Perception(s). It can also result in two or more players submitting the same number of chosen Perceptions. These possible outcomes require that there be rules determining how points are awarded, and how the Initiator of the ensuing round is determined.

Because The Awareness Game's method has the same game objective as Social Awareness Card Game, "to determine which player best perceives how other players perceive others", awarding points on the basis of chance is to be avoided. Therefore, for each submitted Perception that is chosen by the Perceiver, the player submitting it receives one point.

Determining Initiator for the Round of Play

To determine the Initiator for the next round of play, the following method applies: 1) Whenever only one player submits a single chosen Perception, or submits the majority of chosen Perceptions, that player is the Initiator of the next round. 2) If the Initiator is one of two or more players, submitting the same number of chosen Perceptions, and no other player submits more chosen Perceptions, the Initiator continues as the Initiator for the next round. 3) If two or more players, none being the Initiator, submit chosen Perceptions, and one of the players submits the greatest number of chosen Perceptions, that player submitting the greatest number of chosen Perceptions is the Initiator for the next round. 4) If two or more players, none being the Initiator, submit the same number of chosen Perceptions, and no other player submits a greater number of chosen Perceptions, the initiator of the next round of play is determined between the tying players by random method. Examples of random method are each of the tied players drawing from the Persona Deck for the highest ranked card, or using a computer that can randomly generate a number for each of the tied players, or the random selection of one of the tying players being done automatically by the interconnected computerized system.

Determining Initiator and Perceiver of Round in Face of Conflict

As in Social Awareness Card Game, the method of determining the Initiator for the next round can conflict with the method of determining a Perceiver for the next round. This happens when the winner of the present round, who is the Initiator for the next round, is also the next in sequence after the Perceiver of the present round and, therefore, also the Perceiver of the next round. To resolve this conflict, the method of Social Awareness Card Game applies when turns at being Perceiver are determined by the seating of players. "[T]he player to the left of the new Initiator, will be the Perceiver for the next round." In computerized play, in which turns at being Perceiver are determined by a computer-generated random sequence of players' names, the rule is: The player whose name is next in sequence after the player that would have been the Perceiver if she had not become the Initiator. In computerized play, this method is automatically implemented by the system.

Selecting a Performance by Player's Choice

Variable Rule may allow the Initiator, or some other player whose turn is a designated number of turns after the Perceiver's turn, to chose the Performance for the round. Whether this Performance can be a Performance that has already been played is also determined by the majority vote of the players.

Team Play Option

A Variable Rule of the game allows for players to play in a "team" of two or more players. Games can be played with teams competing against other teams, or a combination of teams and individuals playing against each other. Players within a Team may decide to take turns in executing Individual Game Actions for the team, or decide by majority vote of team members, or by any other method agreed upon by the members forming the team. If team members cannot arrive at a majority vote, a team's Individual Action may be decided by each member of the team drawing a card from the persona deck with the team member drawing the highest-ranking card, executing the Individual Game Action of the team. The only requirement for team decision-making is that the team has a system for making an Individual Game Action when required, and always makes a decision when one is required.

Blending of Embodiments

With the possible exception of a computerized random number generator, the First Embodiment of the game does not use computerized devices. In contrast, the Second Embodiment is played on an interconnected computerized system by which players can receive and transmit inputted text and commands with their individual computerized devices. Text is displayed on one, some, or all of the players' devices, as directed by a game program that controls the text displaying on each device in response to Individual and Routine Game Actions.

If the majority of players agree, the two embodiments can be blended. For example, if players are playing face-to-face, but playing on their individual computerized devices according to the Second Embodiment, they may decide, under Variable Rule, to incorporate manually betting with chips into the game. A converse example, is players playing face-to-face according to the first embodiment who decide on using computer devices that are not interconnected, but can upload to screen from memory, or from a compact disk, or flash memory stick, the List of Incomplete Performances and Concomitant Perceptions.

First Embodiment

The First Embodiment of The Awareness Game is played with the players being face-to-face, with the possible exception of the Perceiver, who may be isolated. The game materials used to play this embodiment may include books, and e-books containing the printed text of Incomplete Performances and Concomitant Perceptions, paper and writing instruments such as pencils and pens, writing apparatus such as typewriters, computers capable of displaying text on screen, cell phones capable of accepting and transmitting text to other cell phones, computer(s) capable of randomly selecting a random number from an inputted set of numbers, cards specifically designed for use in the game, and playing cards. The First Embodiment does not implement a computerized programmed inter-communicating system of computers that communicate with each other to perform Individual and Routine Game Actions.

Determining Initiator and Perceiver for the First Round

The Initiator and the Perceiver for the first round of play may be determined by each player drawing a card from the Persona Deck. Cards in the Persona Deck can be ranked by each card having an individual number, with a card having a higher number ranking higher than a card with a lower number. A deck of such cards may be provided for play.

As an alternative to using cards specifically designed for the game, the cards of a playing card deck can be used as a Persona Deck. To do this, the four suits are ranked relative to each other. For example, the rank of suits in ascending order could be Spades, Clubs, Hearts, Diamonds, with any card of a higher-ranking suit outranking any card of a lower ranking suit. Also the cards within a suit are ranked relative to each other. The ranking from lower to higher of the cards within a suit could be: ace, 2, 3, 4, 5, 6, 7, 8, 9, 10, jack, queen, king.

Each player draws the top card from the Persona Deck. The player drawing the highest-ranking card is the Perceiver for the first round. Then each player, except the Perceiver, draws another card from the top of the Persona Deck. The player drawing the highest-ranking card is the Initiator for the first round.

Another possible means for randomly selecting a Perceiver and Initiator for the first round of play is to simply use a computer that has been programmed to select a random number from numbers entered. The program can be run for each one of the players for each of the positions of Perceiver and Initiator, with the player receiving the highest number being assigned the role.

Selecting a Performance Randomly

The number of Incomplete Performances is made to be an even hundred count, with the number of the first Performance being zero (000). The first one hundred Incomplete Performances count from zero to ninety-nine (000-099), the next one hundred count from one hundred to one hundred ninety-nine (100-199), etc.

Four "Ten-Card Decks" are used to randomly form the designating number of an Incomplete Performance. Each of the four Ten-Card Decks consists of ten cards. Each card of a deck is uniquely assigned a digit from zero through nine. These decks can be especially made for the game, with each of the ten cards being uniquely numbered with a digit, from 0 to 9.

In the alternative, playing cards can be used as a random number generator. For example, jacks could count as zeros, aces as ones, and the 2 through 9 cards count as their face value. The four Ten-Card Decks are placed horizontally facedown. The deck furthest to the right provides the number of ones for the number being generated. The deck to the left of this deck provides the number or tens. The third deck to the left provides the number of hundreds, and the fourth deck to the left provides the number of thousands.

The four decks are individually shuffled before the first round of play, and at the least after every tenth round thereafter. This prevents the digits of the generated numbers from repeating in a pattern. At the beginning of each round of play, the top card of each of the four decks is laid down face-up to reveal the digit on its face. The sequence of digits, read from left to right, form the number of the Performance.

The third and fourth Ten-Card Decks to the left are stripped of cards with digits that would, in conjunction with digits on the cards of the other decks, form a number equal to or greater than the total number of cards minus one. For example, if the even hundred count of Incomplete Performances is 800, this is 8 multiples of 100. Because the first card is designated 0000, the eight hundredth card is designated 0799. Therefore, the digits to be stripped from the third deck to the left are 8 and 9. The digits to be stripped from the fourth Ten-Card Deck to the left is every digit except zero.

The use of four Ten-Card Decks provides for the random selection of ten thousand Incomplete Performances, the number designation for the first Incomplete Performance being 0000 and that of the ten thousandth 9999.

An alternative to using Ten-Card Decks for the random selection of Incomplete Performances is to use a computer programmed to randomly select a number from all of the numbers designating Incomplete Performances. The Incomplete Performance designated by the number generated is used for the round.

It is possible for a Performance to be randomly selected that has already been used in previous rounds. When this happens it is most likely that the player who was the Perceiver when the Performance was previously used, is not the Perceiver of the present round. If this is the case, the play can continue without variation in method. If the Perceiver for the present round is the same player who acted as Perceiver in the previous round in which the Performance was previously used, the standard rule is that another Performance must be randomly selected.

Notwithstanding the standard rule, a Variable Rule can allow Performances played in previous rounds. If Performances played in previous rounds are allowed, the Complete Performance and the Perceiver for a round cannot be the same as in a prior round. Therefore, if a player selects a Performance that has been played in a previous round, and the Perceiver of the present round is the same player as the Perceiver of the previous round, the Initiator of the present round must make at least one different choice of words or Persona(s). In the case that the Incomplete Performance has no word choices, and the Persona(s) is chosen by the random method is the same as before, a Persona is selected by using the random method until a different Persona is selected.

Determining a Persona

If indicium within the Incomplete Performance does not indicate that a Persona is to be selected by the Initiator, the Persona is determined randomly. This may be done by drawing a card from the "Persona Deck". This deck can be any deck of cards as long as the cards are distinct from each other so that each Persona can be associated with only one card. For example, if a 52-card poker deck is used, each card of the deck is distinct from all of the other cards and, therefore, can be uniquely associated to one Persona, allowing for up to a total number of 52 Personas in a game.

In the alternative a computer programmed to act as a random number generator may be used to select Persona(s) for each round of play.

Constructing a Complete Performance

How the Incomplete Performance is constructed to become the Complete Performance is directed by indicia within the Incomplete Performance. Indicia may direct that the Persona(s) be randomly selected by drawing card(s) from the Persona deck, or that the Initiator select the Persona from the Persona List. The name on the Persona List associated with the card drawn from the Persona Deck, or the name of the Persona chosen by the Initiator, is inserted into any blank underlined space(s) preceded by an upper case "P", indicating that the Persona is "at-play", or lower case "p" indicating that the Persona is "not-at-play." As stated previously an "i" may follow the "p" to indicate that the Persona is to be chosen by the Initiator, rather than by random method.

As with Persona selections, word choices will be located within the Incomplete Performance at that same location as the chosen word will be located within the Complete Performance. Unlike Persona selections, word choices are listed within the Incomplete Performance, and require no referencing to a list of choices such as a Persona List. Another distinction between word choices and Persona choices is that while all Incomplete Performances require the selection of at least one Persona, an Incomplete Performance does not necessarily require a word choice.

The Complete Performance can be constructed with only one player having the List of Incomplete Performances and Concomitant Perceptions. In this case, the player with the list reads the Incomplete Performance out-loud before the insertion of Persona(s), and word choices. After the Performance is completed with the addition of the Persona(s) and any word choices, the Complete Performance, and its Concomitant Perceptions are read out-loud.

Alternatively, the Complete Performance can be constructed with the Initiator either reading, or not reading the Incomplete Performance out-loud, and with all players being able to view the List of Incomplete Performances and Concomitant Perceptions while the Complete Performance is being constructed. Using this method, each player can individually read the Incomplete Performance while mentally filling-in the Persona(s), and any word choice(s), as they are determined. This method minimizes the number of questions that the Initiator has to answer during play, and, thereby, speeds-up the pace of the game. Once all of the optional wording has been selected, an out-loud reading to all players is helpful to confirm the wording of the Complete Performance.

Choice of Methods for Submitting Perceptions to a Specified Player

Perceptions are submitted to a Specified Player as dictated by Variable Rule, either verbally, by writing, or by texting. Variable Rule can also dictate that Perceptions are submitted confidentially, in which case a player does not know the Perceptions submitted by other players until the player has submitted his own Perception(s). Alternatively, Variable Rule can dictate that Perceptions are submitted openly.

Using this method, each player, excepting the Perceiver, can either see or hear each player submit a Perception.

Verbally Submitting Perceptions to a Specified Player

If Perceptions are submitted verbally to a Specified Player, the Perceiver is positioned so as to be unable to hear play while the Perceptions are being submitted. Then each player, other than the Perceiver, states to the Specified Player, the Persona at-play to whom the Perception applies, the player's choice of Listed Perceptions, or the player's self-composed, or remembered Unlisted Perception(s).

Variable Rule will dictate whether verbally submitted Perceptions are submitted to the Specified Player confidentially or openly. If the confidential rule is in effect, each player submitting a Perception, and the Specified Player to whom Perceptions are submitted must position themselves so that other players cannot hear the verbally submitted Perception(s).

A player's stated Perception being overheard is one potential problem with this method of verbal submission. It is not the only potential problem. With no written record of the Perception submitted, there can be disputes as to the exact wording of a submitted Perception. Exact language can be important. A small difference in wording can be enough to greatly affect the emotional import, and even the basic meaning of a Perception.

When Perceptions are submitted openly, all players, except the Perceiver, know the identity of the player submitting each Perception. This method has the advantage that when submitting a Perception to the Specified Player, it can be stated openly in the presence of other players. Also, because the Perceiver is isolated, players may comment on any of the submissions, and even argue as to which submission the Perceiver is most likely to choose. But, as with the method of verbally submitting Perceptions confidentially, this method can lead to disputes as to the exact wording of the verbally submitted Perception.

Using Round Forms to Submit Perceptions to the Specified Player

In order to save time and avoid confusion, players can submit written Perceptions to a Specified Player in a "Round Form" format. Using this method, each player, other than the Perceiver, completes his own Round Form for each round of play. The Round Form comprises the player's name, the name of each Persona at-play, and the number of the Listed Concomitant Perception that the player chooses for each Persona at-play. A pre-printed form can be used having blank spaces with words indicating the information with which a space is to be filled. Or, a simple sheet of blank paper can be used. If Variable Rules permit Unlisted Perceptions, a player can write the wording of an Unlisted Perception on the pre-printed form or blank paper, instead of the number of a Listed Concomitant Perception.

If Variable Rule dictates that submissions of Perceptions are confidential, players must be careful not to reveal the words on their Round Forms to any other player. Also, players pass their Round Forms facedown to the Specified Player who, before looking at the face of the submitted Round Forms, completes her own Round Form, and places it facedown in front of her. This prevents the Specified Player from being influenced in her choice(s) by the submissions of other players.

If Variable Rule dictates that submissions of Perceptions are open, players pass their Round Forms face-up to the Specified Player and may talk openly about their submissions to other players.

Whether submissions are made confidentially or openly, the players may, if allowed by Variable Rule, talk about their submissions. Of course, this freedom to comment can apply if the Perceiver is in a position in which she can neither hear nor see play, but play is still possible if the Perceiver can hear comments, but cannot see play. An example of this situation is the Perceiver being separated from other players by a door through which the voices of the player can be heard.

Play is still possible when a Perceiver hears a player state the Perception that the player is submitting. Although a player may be making a false statement in order to mislead the Perceiver, this does not necessarily ruin the game. The overheard statements can make play more intriguing, by requiring the Perceiver to appreciate, and understand the deviousness of individual players, and their alliances, and animosities.

Presenting Perceptions to the Perceiver without Electrical Apparatus

After all Perceptions have been submitted to a Specified Player, Variable Rule determines the method by which a Specified Player presents the submitted Perceptions to the Perceiver of the round. The methods not implementing electrical apparatus comprise: 1) The Perceiver is positioned so that she can see and hear the Specified Player. The Specified Player then states, either from memory or notes, or reading out-loud from the Round Forms, the name of a Person at-play, and the Perceptions submitted to apply to the named Persona at-play. This reading is done in such manner as not to suggest to the Perceiver the identity of any player submitting a Perception. This method has the problem that the Specified Player might signal with her eyes, or body gestures the player that submitted the Perception. 2) The Perceiver is positioned so that he can hear but cannot see the Specified Player. The Specified Player states, either from memory or notes, or reading out-loud from Round Forms the name of a Persona at-play, and the Perceptions submitted to apply to the named Persona at-play. This method eliminates the possibility of the Specified Player signaling by glances or body gestures the identity of the player submitting a Perception being read, but does not eliminate signals made by voice intonation. 3) The Specified Player passes facedown to the Perceiver the Round Forms submitted by the players. This method has the problem that the Perceiver may recognize handwriting. 4) The Perceiver is positioned so that she cannot see the Specified Player. The Specified Player copies the Round Forms he has received from the players and passes these copies to the Perceiver. Although tedious, this method is the more effective than the previously stated methods at guarding the identity of a player submitting a Perception.

After the Specified Player has submitted all submitted Perceptions to the Perceiver, the Perceiver announces the Perception of her choice for each Persona at-play. A Specified Player then credits to each player one point for each submitted Perception chosen by the Perceiver. At the end of each round, a player may see the written submission(s) of the other players.

Submitting Perceptions Using Cell Phones

All of the described methods for presenting perceptions to the Perceiver allow for the Specified Player possibly giving an intentional or unintentional signal to the Perceiver of the identity of the player who submitted a Perception. Using cell phones to text Perceptions to a Perceiver that cannot see or hear play eliminates this problem. The use of cell phones eliminates body gestures, eye communications, verbal intonations, and marks or styles of writing that can act as intentional or unintentional signals.

Using Cell Phones in Proximate Play

The use of cell phones can facilitate play in situations where players are playing in the same location. The Perceiver, with a cell phone and the List of Incomplete Performances and Concomitant Perceptions, positions herself in a separate room. An Incomplete Performance is selected and Complete Performance is constructed by methods described. A Specified Player then texts the Complete Performance to the Perceiver.

Or, in order to save players the time and tedium of entering the text of the Complete Performance, a Variable Rule can be adopted. Under this rule a Specified Player texts the letters and numbers within the Incomplete Performance that designate word choices, and Personas. These are chosen by the Initiator, or by random method as directed by indicia. The sequence of these numbers and letters must be the same as the sequence in which they occur in the Incomplete Performance. This allows the Perceiver to construct the Complete Performance by referencing her copy of the Incomplete Performance. Finally, appended to this sequence of numbers and letters are the numbers of submitted Listed Perceptions, and possibly the wording of any Unlisted Perceptions.

The Perceiver will have a copy of the List of Performances and Concomitant Perceptions, a copy of the Persona List, and the sequence of numbers and letters. With this information the Perceiver can determine the randomly selected Incomplete Performance, the word choices(s) made by the Initiator, the Persona(s) chosen or randomly selected, and the Perceptions submitted.

For example: While the Perceiver is in a separate room, the other four players, using the method applicable under Variable Rule, select an Incomplete Performance and Concomitant Perceptions numbered 056. Then the four players construct a Complete Performance. In the Incomplete Performance the first choice of wording is for a Persona-not-at-play. The Initiator chooses from the Persona List the Persona numbered 12. The second choice of wording is between the word designated by "a" and a word designated by "b". The Initiator chooses "a". The next word to be added to the Incomplete Performance is not chosen by the Initiator. The word is a Persona-at-play to be selected by random method. The Persona numbered 21 is randomly selected. Three players now submit Listed Perceptions to apply to the Persona at-play's Performance a described by the Complete Performance. The Listed Perceptions submitted are numbered 2, 3, and 5. The fourth player submits the text of an Unlisted Perception. The text is "Give me a break".

The Specified Player then texts the numbers and letters 056, 12, a, 21, 2, 3, 5, and the text to the Perceiver. On the Perceiver's phone screen appears: "056, 12, a, 21, 2, 3, 5, Give me a break". The Perceiver knows that the first number, 056, designates the Performance of the round. Looking through her copy of the List of Incomplete Performance and Concomitant Perceptions, she finds the Incomplete Performance and its Concomitant Perceptions that is numbered 056. This is the same Incomplete Performance that the Initiator used when he made his choices and random selections. The Perceiver will be able to sequentially substitute the words called for by the Incomplete Performance with the words represented by the sequence of numbers and letters received by text. The Perceiver will know that after she has completed the Incomplete Performance, any additional numbers are the numbers of Concomitant Perceptions submitted by players. In this case the numbers 2, 3, and 5 are submitted Listed Perceptions. Finally, the Perceiver will know that the words "Give me a break" are a submitted Unlisted Perception. The Perceiver will not be able to discern the player submitting each Perception because they will have each been text from the same phone.

As with the other methods of submitting Perceptions, depending on Variable Rule, the submission of Perceptions by cell phone text will be either confidential or open. Confidentiality is maintained by shielding the cell phone while Perceptions are inputted.

After receiving the submitted Perceptions on his cell phone, the Perceiver writes on a sheet of paper his choice of Perception for each Persona at-play. He then delivers the sheet to the other players. Alternatively, the Perceiver texts his selection before rejoining the other players. If the Perceiver joins the others and simply states his choice, this could allow for signaling. Finally, a Specified Player credits one point to each player submitting a Perception chosen by the Perceiver.

Using Cell Phones in Remote Play

Cell Phones can also be used to submit Perceptions when players are playing at remote distances from each other. But this method presents the problem that if players text their submitted Perception(s) to the Perceiver with a standard cell phone, the Perceiver will be able to see who sent the text. To deal with this problem all players can download an app onto their phones that allows their phones to send texts anonymously, and another app that allows for group texting.

Play is then conducted in the same manner as when using cell phones in proximate play, except for these differences: 1) using the anonymous texting app, each player texts her submission directly the Perceiver instead of all submissions being made by a Specified Player. 2) The Perceiver will not have the option of returning to other players, and delivering an oral, or written statement of his choice of Perception(s). The Perceiver will have to text his choice of Perceptions to the other players.

Betting

Betting can be incorporated into the game as a Variable Rule. With betting a part of play, players begin with the same number of chips. Play ends when a player obtains the predetermined number of chips to win the game, or has the most chips after a predetermined number of rounds have been played. Each round of play, each player has the opportunity to bet that the Perception(s) he has submitted will be chosen by the Perceiver. A player whose submitted Perception is chosen, wins back the wager she placed on the her submitted Perception, and all the bets placed by other players on other Perceptions not chosen which apply to the same Persona(s) at-play. If more than one player submits a chosen Perception, the winnings are divided equally between the players submitting the chosen Perception.

Each player, on his turn, exercises one or more of the following betting options used in the game of poker: 1) checking, 2) betting, 3) folding, 4) calling, and 5) raising. Turns for exercising these betting options begin with the player seated to the left of the Initiator, and continue passing to the next player to the left until betting ends. The player whose turn follows the Initiator's is the first to exercise his betting options. Turns then pass to the next player to the left.

Antes

It may be required by majority vote that each player contribute a pre-determined equal number of chips to an ante at the beginning of each round. An ante enhances play by discouraging players from folding.

Opening Bets

Making an opening bet is optional for each player. The opportunity to place the opening bet is first presented to the player whose turn is after the Initiator's. If this player declines to make the opening bet, the opportunity passes to the next player in turn sequence. If all players decline to make an opening bet and there is an ante, the ante is paid to the player whose Perception is chosen.

Betting Actions and their Effects

A player "checks", "bets", "folds", "calls", and "raises" according to the definitions and rules of poker. Each player can raise a bet one time in a round of betting. Because the Initiator's betting turn is last, he will have the advantage of being able to see the bets of all other players before placing his own bet.

If a player folds, the Perception she submitted can still be chosen by the Perceiver. All bets on the Perception on which a folding player folds, continue to "ride on" that Perception if it is chosen. If a player(s), other than the folding player, submits the same Perception(s) as the folding player, and the Perception(s) is chosen, the player(s) wins the bets placed by the folding player on the Perception(s).

If the Perceiver chooses a Perception not played by the folding player, the player who submitted the chosen Perception wins the amount placed by the folding player, as well as amounts placed by other players on Perception(s) not chosen, and applying to the same Persona(s) at-play.

If the Perceiver chooses the Perception submitted by the folding player, and no other player submitted the chosen Perception, all bets on that Perception and competing Perceptions are set aside until the end of the following round. At that time, bets on the Perception submitted by the folding player, and bets submitted by other players on competing Perceptions are awarded proportionally to the player(s) submitting the chosen Perception(s) of the current round.

The all-in Bet

If a player looses all of her chips, she is out of the game, but a player is not necessarily out of the game when she does not have enough chips to call bets. She may make an "All-In Bet" by betting all of her remaining chips on the Perception(s) she has submitted. If the Performance calls for more than one Perception, her chips may be apportioned among her submitted Perceptions in any way she wishes, as long as the amount bet on any Perception does not exceed the amount bet by another player on a competing Perception. The apportioned All-In Bet is deemed to call bets on all the Perceptions submitted by the player betting all-in, even if the player has not placed a bet on one or more of her submitted Perceptions.

If the Perceiver chooses the Perception submitted by a player betting all-in, and the player betting all-in is the only player who submitted the chosen Perception, the player betting all-in gets back the chips she bet, and all chips bet by others on competing Perceptions not chosen. If the player betting all-in, and one or more other players submit the chosen Perception, each player submitting the chosen Perception wins back the chips he bet on the chosen Perception, and an equally divided share of the chips bets on competing Perceptions not chosen.

That part of an all-in bet that is bet on the Perception(s) not chosen, is taken by the player(s) submitting competing chosen Perception(s).

All-in Limited and all-in Unlimited Betting Rules

The effect of an all-in bet on the betting of other players depends on which of two Variable Betting Rules have been adopted at the beginning of the game. Under the "All-In Limited Rule", the total sum of the all-in bet made by the player with the fewest chips sets a maximum allowable amount for the sum of each player's bets for the round. Under the "All-In Unlimited Rule", an all-in bet has no effect on how much other players may bet on the round of play.

Disclosed-Bettor Rule

The "Disclosed Bettors Rule" may be adopted. Under this rule, all players, except the Perceiver, can see each Perception submitted, the Persona to whom it applies, the player(s) submitting it, and the number of chips each player bets on it. The Perceiver must be in a situation in which she can neither see, nor hear play while players are betting.

Undisclosed-Bettor Rule

If using the Undisclosed-Bettor Rule in the First Embodiment, players place their bets before a Specified Player reads the submissions to the Perceiver. In this way the Perceiver is able to see and hear betting without his reactions to the submitted Perceptions influencing betting. After betting is finished, the Specified Player reads the submissions outloud. The Perceiver then makes his choice(s), and winnings are distributed.

Given human inclinations, it would likely be difficult, in face-to-face play to completely prevent signaling to the Perceiver the identity of the player submitting a Perception. Moreover, some signals would likely be less than clear-cut. This could lead to disputes as to whether a penalty should be assessed against an accused player. Therefore, when playing face-to-face, and using the Undisclosed-Bettor Rule, Variable Rule may dictate that the Perceiver must be shielded from play during betting.

Considerations as to Spread Limits

When deciding on Variable Betting Rules it should be kept in mind that in The Awareness Game the concept of bluffing is problematic. The strength of a submitted Perception is purely subjective until the Perceiver actually chooses it. "Tilting one's hand" to a competing bettor is not nearly as consequential as in a game of poker.

For example, a spread limit, which is a lower and upper limit on the amount of a bet or raise, does not have the same potential to affect betting as it does in poker. In poker, if a player bets at the high end of the spread limit this can be a "tell", indicating that the bettor has a strong hand. In The Awareness Game a bet on the high side only reflects the bettor's confidence that the Perception he has submitted will be chosen. It cannot be regarded as a "tell", or strong indicator of the actual probability of his submission being chosen because the assessment of probability is completely subjective. Thus, the spread limit lacks the negative effect it has in poker, yet retains its positive effect of preventing the game from being prematurely ended by very large bets, or boorishly dragged-out by small bets.

Variable Betting Rules

When betting is incorporated into a game, the Variable Betting Rules are: 1) The number of chips with which players begin the game, 2) The number of chips a player must have to win the game, 3) Whether an ante is required from each player at the beginning of each round of play, and if so, the amount of the ante, 4) The number of times a call can be raised, 5) Whether there is a minimum, or maximum allowable bet on a bet or raise, and if so, the amount of the minimum, or maximum, 6) Whether the All-In Limited Rule, or the All-In Unlimited Rule is in effect, 7) Whether the Disclosed-Bettor Rule, or the Undisclosed-Bettor Rule is in effect.

Special Problem when Playing Remotely

Play from remote locations eliminates the possibility of a player spying on another's screen. Unfortunately, it creates the possibility of a player, in conspiracy with the Perceiver, telling the Perceiver, by telephone or other remote means, the Perception he will be submitting. Nonetheless, it is hard to imagine a motivation for this type of cheating, unless betting for money is incorporated into the game. With betting for money incorporated into the game, the ill-gotten winnings could be shared by co-conspirators. To guard against this type of fraud, it is advisable that games played for money be played face-to-face.

Determining the Winner of the Game

Variable Rule determines how the winner of the game is defined. One rule is that the winner is the first player to attain a predetermined number of points or chips. Another rule is that the winner is the player that has the most points or chips after a predetermined number of rounds of play.

Variable Rules

The Variable Rules of a game are decided by majority vote, before beginning the first round of play. These rules are: 1) The sequence of players' turns, 2) Whether there will be a time limit on Individual Game Actions, and if so, the time limit for each action, and the penalty for exceeding the time limit, 3) Whether players are allowed to play in teams, 4) The Specified Player(s) for performing each type of Routine Game Action, 5) Whether the Incomplete Performance and Concomitant Perceptions for each round of play will be chosen randomly or by a player, 6) Whether the same Performance can be used more than once, 7) Whether betting will be incorporated into the game, 8) Whether the winner of the game will be the first player to attain a predetermined number of points or chips, or be the player who possesses the greatest number of points or chips after playing a predetermined number of rounds, 9) The number of points or chips required to win a game, or the number of rounds to be played before points or chips are tallied to determine the winner of the game, 10) Which players will have a copy of the List of Incomplete Performances and Concomitant Perceptions, 11) Whether Unlisted Perceptions will be allowed, 12) Whether only Unlisted Perceptions will be allowed, 13) Whether Perceptions will be submitted openly or confidentially, 14) Whether the Perceiver will be allowed to see other players while Perceptions are submitted, 15) Whether the Perceiver will be allowed to hear other players while Perceptions are submitted, 16) Whether Perceptions will be submitted to the Perceiver using Round Forms, copies of Round Forms, verbally, or by texting.

Second Embodiment

Apparatus

In the Second Embodiment of The Awareness Game, players use a system comprising a computerized, programmed, inter-communicating system made-up of a server and computers to execute and display Routine Game Actions and Individual Game Actions in accordance with game method and the inputs of players.

Pre-Game Communications

If prior to a game players are located remotely from each other, players must be able to communicate from their remote locations in order to decide on players, Variable Rules, and the persons, or things to be listed on the Persona List. In this situation, the use of conference calling, and group texting facilitates play.

Setting Game Program Controls and Inputting Game Data

Before game play begins, the Initiator, or Volunteer inputs into the system the names of players, the Persona List, and program settings that enable or disable variations in game method as determined by Variable Rule. The settings comprise those governing whether the Perceptions will be submitted openly, or confidentially as described in the first embodiment, with the additional option allowing Perceptions to be submitted "blindly". A "Blindly Submitted Perception" is submitted without disclosing to any of the players, including the Perceiver, the player submitting the Perception.

If Perceptions are to be submitted openly, the appropriate setting provides for the display on the screens of all players each Perception submitted and the name of each player submitting it. If Perceptions are to be submitted confidentially the name of each player submitting a Perception does not appear with the Perception submitted. If Perceptions are to be submitted blindly the submitted Perceptions, without the name of the submitting player, only on the Perceiver's screen.

In the case of face-to-face play, the sequence of players' turns is also inputted. The inputted sequence of players' names corresponds to the clockwise sequence of the players sitting around a table. From the inputted names of players, the system randomly selects the Initiator and Perceiver for the first round of play. From then on the Initiator for the round is the winner of the previous round, and the Perceiver of the round is the player next in sequence after the Perceiver of the previous round.

The screens of all players work in synchrony to play, with each screen showing play in conformance to the rules of the game. For example, in all variations of the game, the Perceiver's screen must show submitted Perceptions without displaying the names of the players' submitting them. In contrast, if under Variable Rule Perceptions are to be submitted openly, the name of the player submitting a Perception is displayed with the Perception submitted. Another example of synchrony is that the screen of the Initiator must allow the Initiator to select word choices from those presented in the Incomplete Performance, while the screens of other players are locked-out of making selections of wording, As in the first embodiment, for each round an Incomplete Performance and Concomitant Perceptions, is selected, unless the Incomplete Performance of the previous round is followed by a Sequential Performance, in which case the Sequential Performance is used. Also as in the first embodiment, the selection of an Incomplete Performance and Concomitant Perceptions as performed randomly, or by one of the players. If selection is done randomly it is done automatically by the system. If the selection is by choice of a player, this player is either the Initiator of the round, or the player whose turn follows the Perceiver's turn by a predetermined number of turns.

If the Incomplete Performance calls for the Persona(s) to be selected randomly, the system selects the Persona(s) from the names inputted from the Persona List. If the Incomplete Performance requires a choice of Persona(s), the Initiator makes the choice of Persona(s) from the Persona List. At this point, if within the Incomplete Performance, there are no word choices, the Performance is complete. If the Incomplete Performance presents word choices, the Initiator makes the choices.

After the Incomplete Performance has been constructed to be a Complete Performance, the Complete Performance displays on the screens of all players. Each player makes her choice of Perception(s), which display simultaneously on the Perceiver's screen. Finally, the Perceiver indicates his choice of the displayed Perception(s). At the end of the round, the selection(s) of Perceptions made by the Perceiver, and resulting scores are displayed on each player's screen.

Game Situations

The game program that controls the players' inter-connected computerized devices is designed to work in various game situations, with minimal need to adapt programming for different game playing situations. There are three situations within which players can play using the method of the Second Embodiment.

Face-to-Face Situation

In this situation all players play face-to-face at the same location, except for when Variable Rule requires the Perceiver to be isolated. When playing face-to-face it is practical for players to be seated around a table as in the First Embodiment. This is true even in the case that players have computerized devices that allow them to roam, such as smart phones. Being seated around a table is especially practical if tabletop, or game terminal devices are employed. As in the First Embodiment, players are seated facing each other, with the clockwise sequence of their seating determining the sequence of players' turns. This sequence of turns is inputted into the program, so that the program can synchronize the screen display of each player to the player's turn for performing one of the four individual game actions.

Advantages of this style of play are that players are all together at the beginning of the game to decide on Personas and Variable Rules, and that players can easily follow play as it passes from player to player. This results in minimal need for the players to check on the current game situation, or be notified by the system when it is their turn.

Semi-Remote and Remote Situation

In this situation players are sometimes together, and sometimes apart Examples of this "Semi-Remote Situation" are a house or garden party where the players are often roaming. Players are able to take advantage of being face-to-face at the beginning of the game to decide on Variable Rules, and to input Variable Rules, players, and Personas into the system. During play, the players might interrupt their play for socializing. To deal with resulting delays in play, players might, under Variable Rule, impose a time limit for executing Individual Actions, or just allow for leisurely play.

If, when playing in a Semi-Remote Situation, submissions of Perceptions are required to be confidential, it may be difficult for players to shield submitted Perceptions from other roaming players. Therefore, the majority of players might decide that submissions of Perceptions be done openly. Whether the confidential or open submission rule is in effect, the Perceiver may be required by Variable Rule to remain in a specified location so that other players can more easily avoid his seeing or hearing clues as to their submissions.

In "Remote Play" situations, players are playing at remote distances from one another, with no likelihood of seeing or hearing each other during play. In this situation the attention of players may at times stray from the game. To counter delay, a time limit for executing individual actions can be imposed under Variable Rule. A penalty of losing points, or losing the opportunity to submit Perception(s) can be imposed for violating the time limit. On the other hand, players can decide to have a leisurely game with no time limits for the execution of a turn.

In the situations of semi-remote, and remote play, the sequence of players' turns does not correspond to the relative location of players. Therefore, the system generates a random sequence of players' turns that applies for the duration of a game. After the first round of play this sequence is also used as in the First Embodiment for determining the Perceiver. To wit, the Perceiver of the round is the player whose turn follows the turn of the previous Perceiver.

Individual Game Actions

As in the First Embodiment, the Individual Game Actions of 1) choosing Persona(s) 2) choosing text, 3) submitting Perceptions, 4) choosing Perception(s) from those submitted must be done only by the player whose turn it is to execute the action. The system operates so that each of these Individual Game Actions is performed by the proper player, and in the proper sequence as authorized by the rules.

Presentation of Perceptions on Perceiver's Screen

It is important that the submitted Perceptions do not appear on the screen of the Perceiver in a way that indicates the identity of the player submitting the Perception. In the case of face-to-face play, if a Perceiver could see Perceptions appear on his screen when a player indicated an item on the player's screen, or as the player typed text, the Perceiver could deduce who submitted each Perception submitted.

If Perceptions appeared on the screen of the Perceiver in the order in which they were submitted, the Perceiver could, over time, observe a usual pattern in the sequence of players' submissions. For example, the Perceiver might observe that one player is usually the first to submit a Perception, while another is usually the last. The Perceiver would then have a strong clue as to who submitted at least two of the Perceptions.

To counter this potential problem, neither listed, nor unlisted Perceptions display on the Perceiver's screen until all Perceptions have been submitted. Then all of the submitted Perceptions, matched to the Personas at-play to whom they apply, simultaneously display in a random sequence, on the Perceiver's screen, as well as on the screens of all other players.

To further shield from the Perceiver the identity of players submitting Perceptions, Listed and Unlisted Perceptions appear together on the Perceiver's screen in the same style of print and presentation. In this way, a Perceiver, who has not seen the Concomitant List of Perceptions, should not be able to distinguish between Listed and Unlisted Perceptions.

Physical Shielding of the Perceiver in Face-to-Face Play

Because it is essential that players' screens be shielded from the Perceiver, players may have to reposition their screens at the beginning of each round. After repositioning, the backs of players' screens should face the new Perceiver.

Another method of preventing the Perceiver from viewing the screens of other players is to require the Perceiver to be in a position from which she can neither see, nor hear play. This is easily done by requiring her to be in another room while Perceptions are submitted.

If a player divulges the identity of a player submitting a specific Perception, the divulging player can be penalized as determined by Variable Rule. Possible penalties are being excluded from the game, losing a number of points or chips, or not being allowed to submit a Perception for one or more rounds, Blind Submissions The majority of players may desire that players not be aware of the Perceptions submitted by other players. This method of "Blind Submissions" requires that submitted Perceptions not appear on any screen except the Perceiver's until the Perceiver has made his choice(s) of Perception. After the choice(s) has been made, this method could have screens show the Perceptions submitted and the players submitting them.

Confidential Submissions

The majority of players may desire that players be aware of the Perceptions submitted by other players, but not the identity of the players submitting them. This method of "Confidential Submissions" requires that the Perceptions submitted display on all screens without the names of the players submitting the Perceptions. Using this method the names of submitting players can appear with the Perceptions submitted after all Perceptions have been submitted.

Open Submissions

The majority of players may want Perceptions submitted such that players, other than the Perceiver, know who submitted each Perception and the Persona(s) to whom the Perception applies. Using this method of "Open Submissions" each submitted Perception, the player submitting it, and the Persona(s) to whom it applies are displayed on all screens, except the Perceiver's. After all Perceptions have been submitted, only the Perceptions, and the Personas to whom they apply appear on the Perceiver's screen.

Face-to-Face Play

If playing remotely, the fact that players cannot hear or see each other is, by itself, sufficient to shield from the Perceiver the identity of the players submitting Perceptions to the Perceiver. If playing face-to-face additional method is required for shielding the identity of the players submitting Perceptions from the Perceiver. If submissions are to be made confidentially, additional methods must include each player shielding his screen from others.

One method of shielding the Perceiver is to require him to be in a position in which he can neither see, nor hear play. Using this method, players may talk openly to each other about the relative merits of Perceptions, without worrying about revealing the Perception(s) they are submitting to the Perceiver.

Another method of implementing Open Submissions allows the Perceiver to see and hear play, while not allowing the Perceiver to view the screens of other players. This method is feasible for the same reason stated in the discussion of open submissions in the First Embodiment. To wit, just because a player says that she is submitting a particular Perception does not mean that she actually is.

Whatever the rule may be regarding what the Perceiver may hear or see, it is important to consider that if a player knows another player has superior knowledge of how the Perceiver perceives the Persona, the player may gain unfair advantage by following the lead of this other player. This undermines the objective of the game, which argues for a Variable Rule requiring each player to be positioned so that she is unable to view the screens of other players.

Determining the Initiator, Perceiver, and Point Distribution

The system ends a round by adding a point to the score of each player submitting a chosen Perception. The program then uses the inputted, or the randomly generated sequence of players' turns to implement the method described in the First Embodiment for determining the Initiator and Perceiver for the next round. Play continues until a player has attained the predetermined number of points to win the game, or the predetermined number of rounds has been played requiring a tally of scores.

Current Game Situation

It is anticipated that many players, when playing remotely, will want to play intermittently, at their convenience. To allow for this style of play, it is essential that all players are able to review the "Current Game Situation". With this information players can retrieve to their screens the texts to be used in playing the current round of play. The Current Game Situation comprises: 1) the number of game points won by each player in the current game, and the number of points required to win the game, or the number of rounds to be played before the required tallying of scores to determine the winner of the game, 2) the names of the Initiator, and Perceiver for the current round, 3) the names of the players, the sequence of their turns, and the name of the player currently exercising he turn, 4) the Performance of the round in its present form, as it is transformed from its incomplete form to its complete form, 5) the Persona List, 6) a list of submitted Perceptions for the current round. (In the case of submissions being confidential, the list of submitted Perceptions is not displayed until all Perceptions are submitted), 7) the Perception(s) chosen by the Perceiver in the current round.

Variable Rules

The interconnected system of computerized devices is set, and data is input into the system in order that the system can implement the Variable Rules, agreed-upon by the majority of players. These Variable Rules to be inputted are: 1) The sequence of players' turns, 2) Whether the Incomplete Performance and Concomitant Perceptions for each round of play will be chosen randomly, or by a player, 3) Whether the winner of the game will be the first player to attain a predetermined number of points or chips, or be the player who possesses the greatest number of points or chips after playing a predetermined number of rounds, 4) The number of points or chips required to win a game, or the number of rounds to be played before tallying points or chips to determine the winner of the game, 5) Whether Non-Listed Perceptions may be submitted as an alternative to submitting Listed Perceptions, 6) Whether only Non-Listed Perceptions may be submitted 7) Whether the submission of Perceptions will be open, confidential, or blind.

Other Variable Rules that are implemented by players and not the system are: 1) Whether betting face-to-face will be incorporated into the game, 2) Whether there will be a time limit on Individual Game Actions, 3) The length of a time limit, if any, on Individual Game Actions, 4) The point or turn penalty for exceeding any time limit for Individual Game Actions.

BRIEF DESCRIPTION OF DRAWINGS

FIG. 1 shows an Incomplete Performance and twenty listed Concomitant Perceptions. The Incomplete Performance is structured for a single Persona, randomly selected, and inserted into the single underlined blank space.

FIG. 2 shows an Incomplete Performance calling for a single randomly chosen Persona whose name must be inserted at each of the two underlined blank spaces. The Incomplete Performance also calls for the selection of one of the listed word choices, a through k.

FIG. 3 shows an Incomplete Performance with two Personas, P1 and P2. Each Persona is a persona-at-play as indicated by the "P" being upper-case. Each Persona is also chosen by random selection as indicated by there not being a "i" following the P1 or P2.

FIG. 4 shows the same Incomplete Performance and Concomitant Perceptions as FIG. 3, except that there is an "i" following P2. This "i" indicates that P2 is selected by the Initiator rather than by random selection.

FIG. 5 shows the same Incomplete Performance as FIG. 4, with two changes. One change is that the "P1" designation is changed to simply "P". This change reflects that there is now only one Persona at-play, chosen by random selection. The second change is that the "P2*i*" designation is now simply a lower case "p". This lower-case "p" indicates that the second Persona "not-at-play". The lack of an "i" indicates that the second not-at-play Persona is determined by means of random selection. All of the listed choices of Perceptions, 1 through 13, apply only to the single Persona-at-play, P, chosen by random method.

FIG. 6 shows an Incomplete Performance with two Personas-at-play in which each of the Personas are chosen by the Initiator from the Persona List. In this Performance each of the two Personas plays a defined part within the Performance. The seven listed choices of Perception describe either a joint or common Perception that each of the Personas share, such as 2, 4, 6, and 7, or a separate and distinct Perception for each Persona such as Perception choices 1, 3, and 5.

FIG. 7 shows the same Incomplete Performance as FIG. 6, but the choice of Perceptions are set forth so that players must chose a separate and distinct Perception for each of the Personas-at-play.

FIG. 8 shows an Incomplete Performance with one Persona at-play, P, and one Persona not-at-play, p. The Initiator of the round must choose one of the choices of wording a through d, unless Variable Rules allow for unlisted Perceptions.

FIG. 9 shows a Sequential Performance in which three Performances, a, b, and c, must be played sequentially. The Persona at-play for each of the Sequential Performances is the same. This Persona is selected by the Initiator as indicated by the "i" immediately following the first "P" in the first Sequential Performance. The ensuing "P"s are not followed by an "i". This is just a choice of style. The "P"s throughout each of the Sequential Performances could be followed by "i"s.

FIGS. 10 through 15 show the Process Flowchart of the Second Embodiment Method of playing the game.

DETAILED DESCRIPTION

Figure 10:
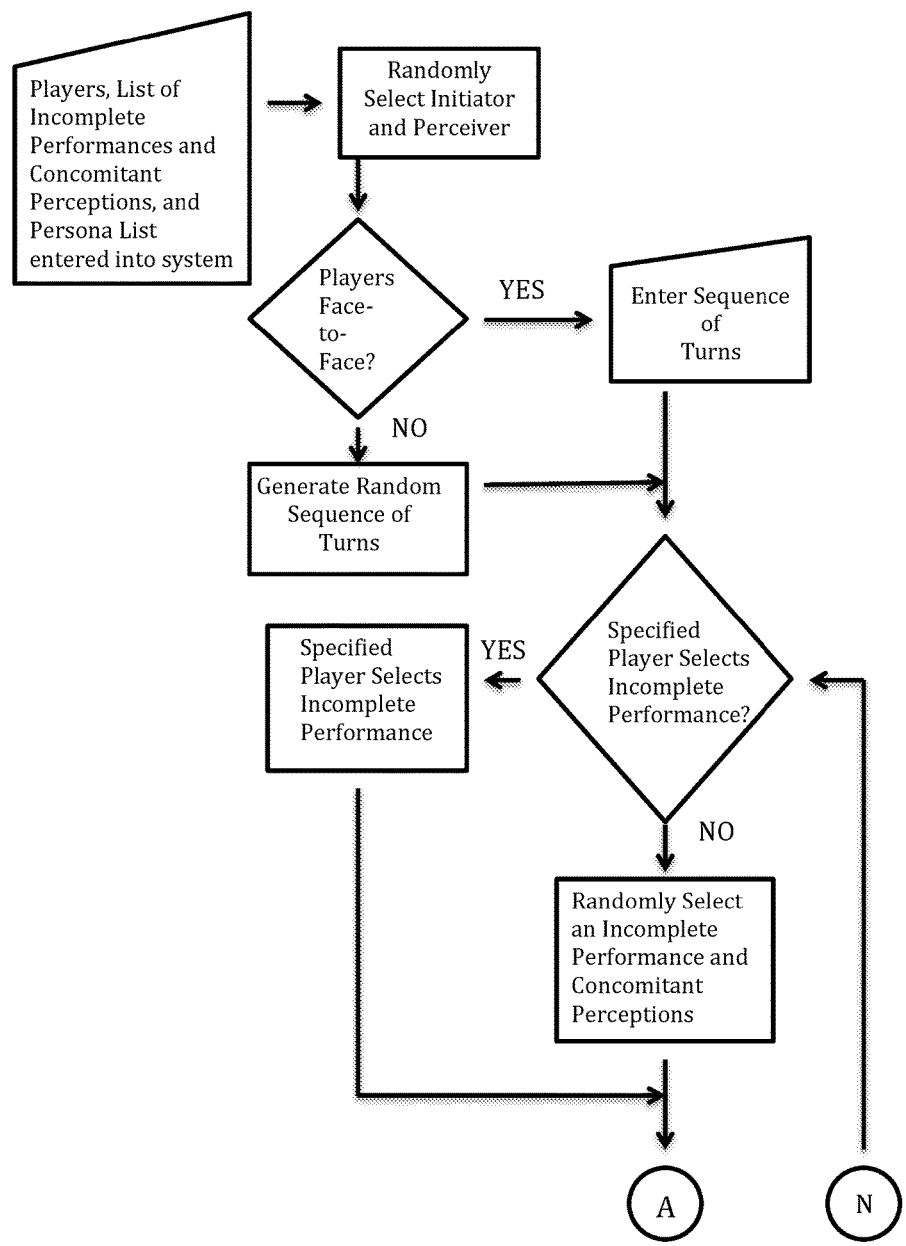

Initial reference is given by way of FIG. 1, exhibiting an Incomplete Performance and twenty Perceptions. The Performance is recognized as the first in the List of Performances by the fact that it is designated by "zero". It is also recognized as incomplete by the underlined blank space in the sentence stating the Performance. The underlined blank space indicates the location of a missing word or words. In this case the word is the name of a Persona as indicated by a "P" preceding the underlined blank space. An upper case "P" indicates a Persona is "at-play" which requires that each player, other than the Perceiver submit a Perception for the Persona. The absence of an "i" following the "P" indicates that the Persona is determined by random method, rather than being chosen by the Initiator of the round.

The initial clause of "If P_____ were a Shakespearean actor/actress" makes-up the Incomplete Performance. When the name of the Persona is determined and inserted, the Performance will be complete. The words "actor/actress" and "his/her" are not word choices from which the Initiator is to choose. If these words were choices, they would be presented in the following style: a) actor b) actress, and a) his b) her, and the Initiator would choose which word choices to include in the statement of the Performance. In this case the slash between word choices signifies that the word choice is selected on the basis of grammar. If the Persona is female, the words "actress" and "her" are the correct grammatical choices.

The wording of the twenty Perceptions begin with the initial clause, "his/her favorite role would be". This is followed by twenty numbered clauses, each of which, when joined to the initial clause, forms a complete sentence stating a Perception. Each Perception states a Shakespearian role that a player might think the Perceiver of the round is most likely to think the Persona would chose as his or her the favorite role, if the Persona were a Shakespearian actor or actress.

In this Performance the Persona is imagined to be in a particular situation, that is, be a Shakespearean actor or actress with a favorite Shakespearean role. If the rule has been adopted excluding the submission of non-listed Perceptions, each player, other than the Perceiver, is limited to choosing one of the twenty listed Shakespearean roles S as the role that the Perceiver perceives would be the Persona's favorite. If the rule has been adopted that allows for the submission of non-listed Perceptions, a player could submit a role not on the list, for instance Katharina in "The Taming of the Shrew".

Reference to FIG. 2 shows an incomplete Performance in which the name of the Persona must be inserted twice into the sentence stating the Performance. The indicator P stands for Persona. The upper case "P" indicates that the Persona is "at-play". Therefore, players submit Perceptions applying to the Persona. The absence of an "i" following the "P" indicates that the Initiator does not choose the Persona, but rather that the Persona is determined by the random method of drawing a Persona card, or automatically by the computerized system. The wording in bold type denotes that the wording is not optional, but required. The wording that is not in bold type is to be selected by the Initiator selecting one of the wordings designated by letter. The listed Perceptions are also not in bold type. This also indicates that a choice between them is to be made by the Initiator.

To complete the Concomitant Perceptions, the Person's name is inserted into the second underlined blank space creating the initial clause, "(Persona's) reply is most likely to be". Then each of the nine listed numbered replies is added to the initial clause to form nine Perception choices. Each player, other than the Perceiver, must choose one of the listed Perceptions, unless Variable Rule allows for submitting Unlisted Perceptions.

FIG. 3 is an example of an incomplete Performance requiring that a distinct Persona be inserted at each of the blank unlined spaces. The letter/numbers, P1 and P2, to the side of each underlined blank space designate the first Persona and the second Persona respectively. Each uppercase "P" indicates that the Persona indicated is "at-play", and will require a Perception. Because there is no "i" following either P1 or P2, each of the Personas are determined by drawing a card from the Persona Deck, or automatically by the computerized system. The Perceptions all begin with the clause, "The likeliest outcome is". This clause is followed by one of the listed fourteen clauses to form the sentence making-up a Perception. In the case of this Performance, any chosen Perception applies to both of the Personas.

This Perception and its concomitant Perceptions is an example of the Perceptions of the Personas within a described situation of a Performance, being inferred by an outcome that implies their reactions to the situation.

The list of Perceptions is a list of possible outcomes to the described situation of the Performance. A reaction of one Persona, or the shared reaction of the two Personas is implied by each of the outcomes listed.

FIG. 4 is the same incomplete Performance as FIG. 3 except that there is a "P2i" preceding the blank space for the second Persona instead of a "P2". Again, the high-case "P" indicates that P1 is "at-play". Because there is no "i"

following P1, P1 is to be determined by drawing a card from the Persona Deck, or automatically by the system. In the case of P2, the upper-case "P" indicates that the Persona is at-play. Therefore, players will submit a Perception for P2. The "i" indicates that the Initiator chooses this Persona. Of course, it behooves the Initiator to use strategic thinking when choosing the second Persona. The Initiator should consider how the Perceiver of the round perceives how a possible P2 perceives P1, and how P1 perceives a possible P2.

Reference to FIG. 5 shows an incomplete Performance wherein the first Persona is "at-play" as indicated by the upper-case "P". Players are, therefore, required to submit a Performance to the Perceiver for P1. Also, P1 is randomly chosen as indicated by there not being an "i" following "P1". The second Persona, "p", is not-at-play as indicated by the lower-case "p". The Persona indicated by "p" can be thought of as just a part of the situation making-up the Performance. Therefore, players will not submit a Performance for p. The second Persona is chosen by the Initiator as indicated by the "i" following the "p". Although P1 is in the same situation as in FIGS. 3 and 4, the Perception in this case applies to P1 alone, with the Performances being various possible mental reflections P1 might have in reaction to the situation.

Reference to FIG. 6 shows an Incomplete Performance in which P1 and P2 are "at-play", and, therefore require each player other than the Perceiver of the round to submit a Perception for each Persona. The Personas have dissimilar roles in performing a joint activity that allows for the perceived reactions of each of the Personas to range from being the same to being very different. This range of perceived reactions is reflected in the listed Perceptions. It should be noted that choices 2, 4, 6, and 7 are equivalent to two Personas sharing the same Perception.

The Incomplete Performance of FIG. 6 also indicates that P1 and P2 are to be chosen by the Initiator of the round as indicated by the letter "i" that follows each Persona designation.

Reference to FIG. 7 shows the same incomplete Performance as that of FIG. 6 except that the individual Perceptions of each Persona are stated independently of the other Persona. With this structuring of the Perceptions, if the Personas were to share the same Perception, the shared Perception would have to be stated twice, once for each Persona. Also, at least one of the Perceptions would also have to be submitted as an Unlisted Perception, because none of listed Perceptions for P1 are duplicated by listed Perceptions for P2.

The most significant aspect of FIG. 7 as compared to other figures is that it requires each player to submit two Perceptions for one Performance. One Perception will apply to P1, and another to P2.

Reference to FIG. 8 shows an incomplete Performance with two Personas, the first Persona is at-play and to be selected randomly as denoted by the upper case "P" preceding the blank underline space at three locations within the Incomplete Performance. The second Persona is not-at-play and is to be chosen by the Initiator as denoted by the lower-case "p" followed by an "i" before the blank underlined spaces at two locations in the Incomplete Performance. There is also a choice of wording to be made by the Initiator. This is indicated by a sequence of words and phrases that are not printed in bold lettering, with each choice being preceded by a letter designation.

The fact that Performance selections are presented in a definite sequence of choices within the Incomplete Performance allows the Perceiver to communicate her selection of word choices in a sort of shorthand. For example, using the Performance and Concomitant Perceptions of FIG. 8, the number of the Performance is 066. Assume that that the number of the randomly selected Persona at-play for the round is 23, the number of the Persona not-at-play chosen by the Initiator is 5, the Initiator's choice of wording is b) sports, and the Perceptions chosen by players are numbered 1, 3, 4, and 9. A Specified Player for the round could text the following to a Perceiver: 066, 23, 5, b, 1, 3, 4, 9. With this letter/number sequence, and a copy of the Incomplete Performance, the Perceiver can construct the Complete Perception for the Round, and text her choice of Perceptions back to the Specified Player.

Reference to FIG. 9 shows a group of Sequential Performances numbered 301. It has three parts designated as: a, b, and c. Each part, a through c, is played sequentially as a separate round. The roles of Perceiver and Initiator transfer between the three rounds according to the same rules applying to Performances that are not sequential. Nonetheless, all players may agree to the Variable Rule that the role(s) of the Perceiver, or Initiator, or both remain with the same player(s) for each of the Sequential Performances, a through c.

Figure 11:
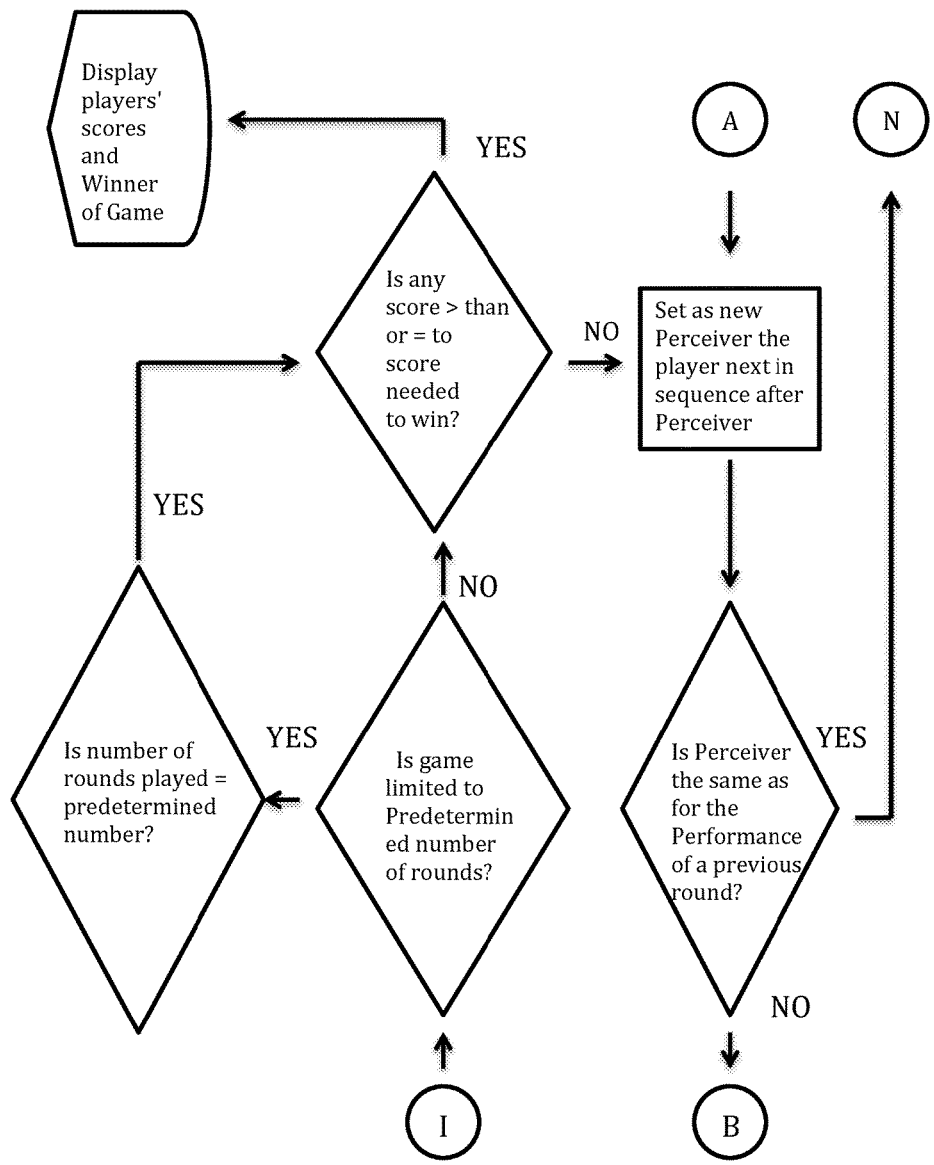
Figure 12:
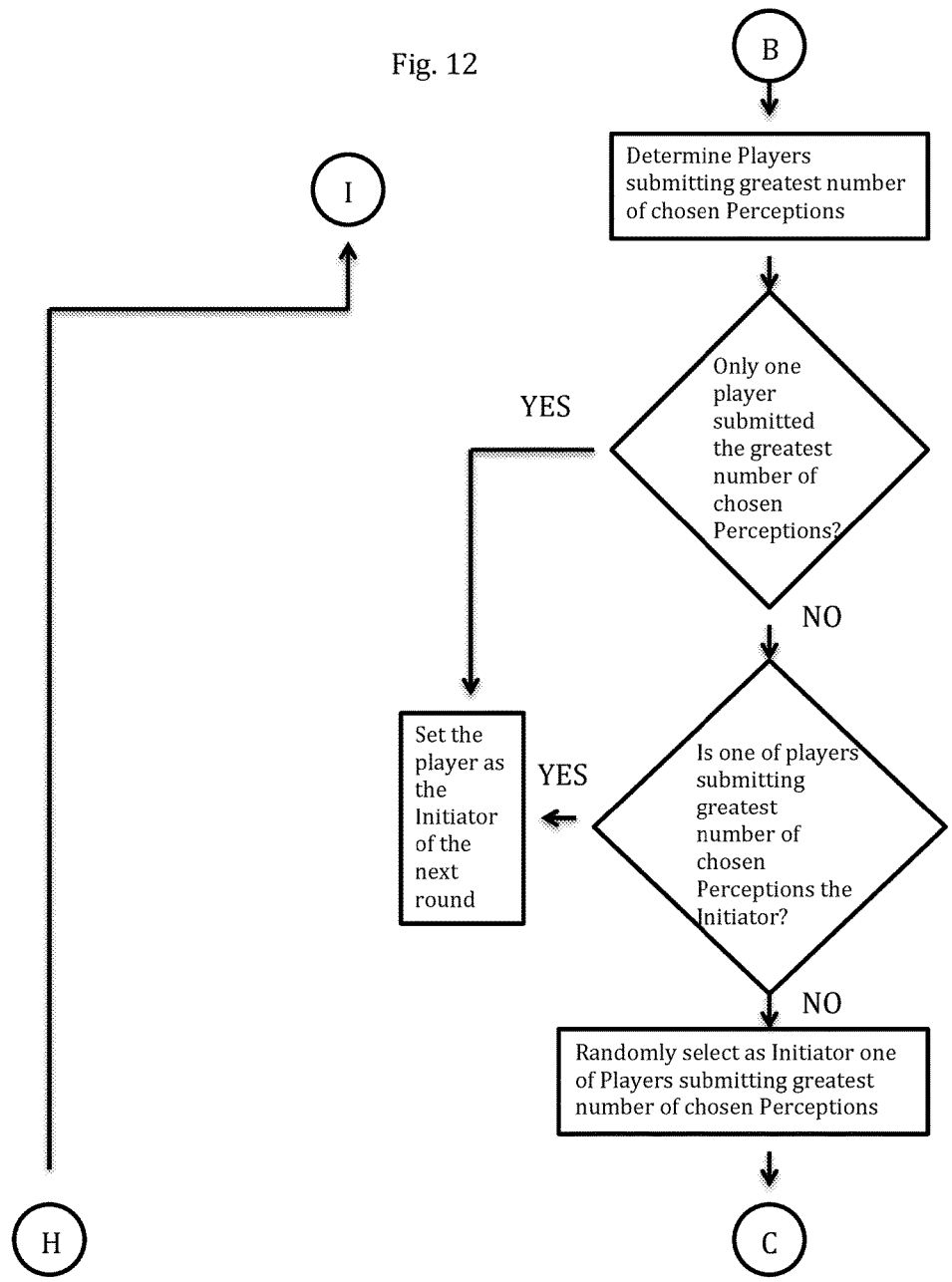
Figure 13:
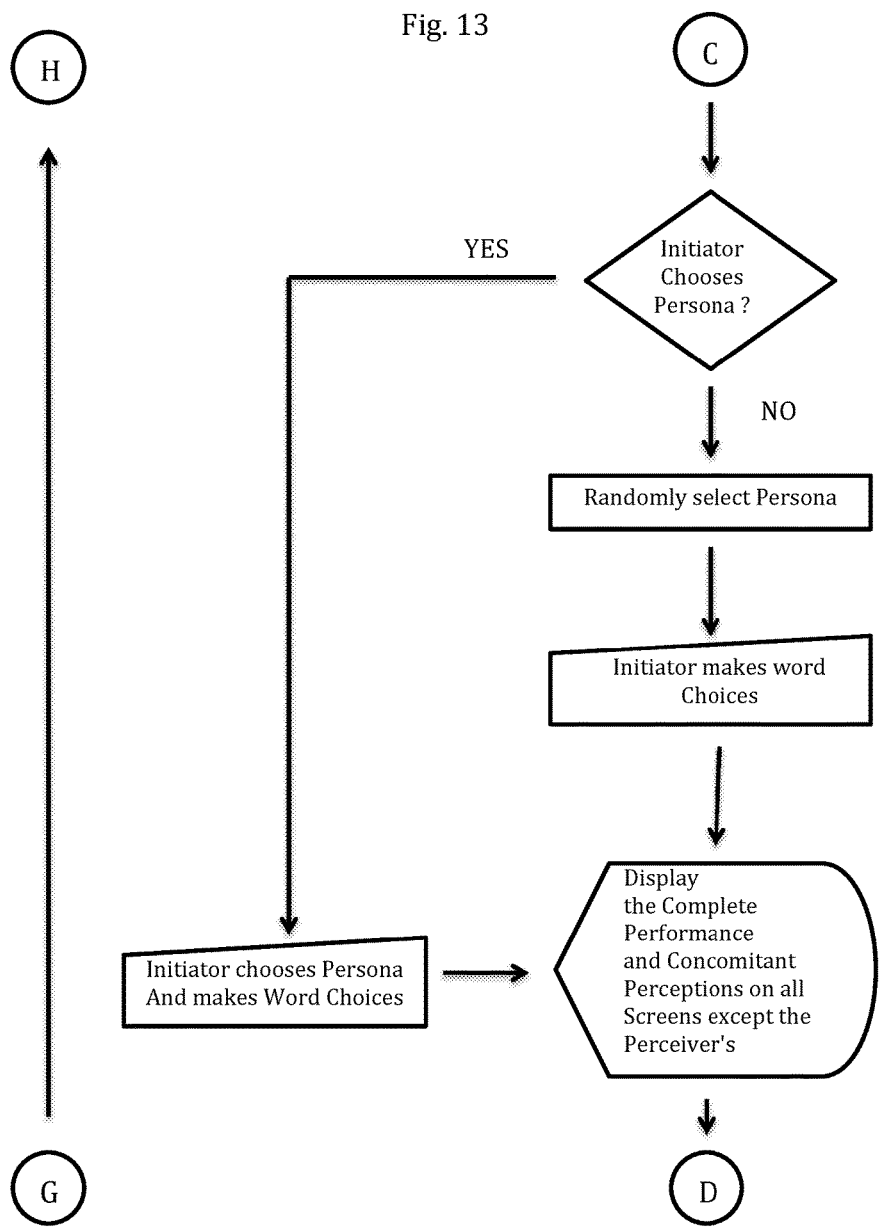
Figure 14:
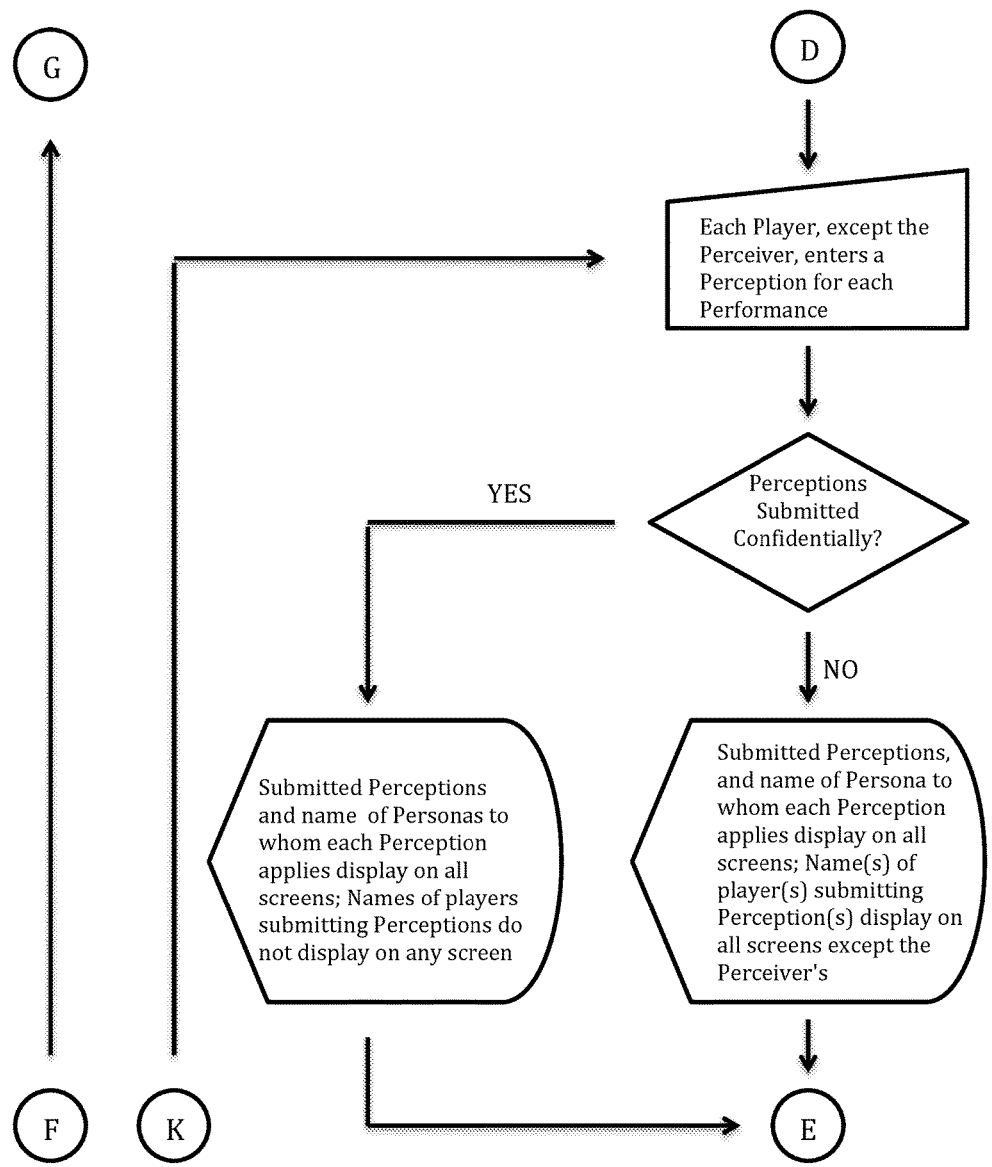

Reference to FIGS. 9 through 15 illustrates the method of the Second Embodiment.

Therefore, I claim:

1. A method of playing a game in which each player attempts to demonstrate that he/she is the most aware of how each of the other players perceive other persons, the method of playing comprising, a) randomly selecting a player to be the a perceiver for the first round, and a player to be an initiator for the first round, b) determining variable rules by majority vote, c) selecting by majority vote a specified player(s) for performing routine game actions, d) players creating a persona list by unanimously approving persons to be personas in the game, and assigning each of said unanimously approved personas with a card in the persona deck, or a number unique to each of said approved personas, e) randomly selecting an incomplete performance, or said initiator of the round, or the player whose turn follows the turn of the perceiver by a predetermined number of turns, choosing an incomplete performance, f) if indicated by indicia within said incomplete performance, randomly selecting a persona by drawing a card from said persona deck and reading the name on the persona list associated with said drawn card, or randomly selecting a persona by generating a number by means of a random number generator and reading the name on the persona list associated with said generated number, and inserting the randomly selected persona into said incomplete performance at the position indicated by indicia within said incomplete performance, g) if indicated by indicia within said incomplete performance, said initiator choosing a persona(s) from the persona list to be inserted into said incomplete performance at the position(s) indicated within said incomplete performance, h) if indicated by indicia within said incomplete performance, said initiator choosing a word(s) from word choices presented within the incomplete performance, thereby creating a complete performance, i) each player individually reading said complete performance and concomitant perceptions, or each player listening to a specified player reading out-loud said complete performance and concomitant perceptions, j) each player, except the perceiver for the round, filling-out a round form with the name of said each player, the name of each persona at-play in said complete performance, and a perception chosen from said concomitant perceptions by said each player to apply to said each persona at-play, k) each player, except the perceiver for the round, passing facedown said round form to a specified player not the perceiver, l) said specified player reading out-loud from each of said round forms, said name of each persona at-play, and said perception chosen by said each player to apply to said each persona at-play, m) the perceiver choosing one of said perceptions chosen by said each player to apply to said each persona at-play, n) each player being awarded a predetermined number of points for each of said perception(s) chosen by said perceiver, o) if the score of a player is equal to or greater than the predetermined score required to win the game, said player being declared winner of the game, p) if no player has a score equal to, or greater than the predetermined score required to win the game, designating the player submitting the chosen perception as the initiator of the next round of play, and designating the player whose turn follows the turn of the perceiver the perceiver for the next round of play.

2. The method of claim 1 further comprising filling-out said round form with a perception composed or remembered by said each player.

3. The method of claim 1 wherein said lists of concomitant perceptions are not used, players submitting unlisted perceptions composed, or remembered by each player.

4. The method of claim 1 wherein each player, except the perceiver, passes to said specified player said each player's choice of said individually-read or read-out-loud concomitant perceptions, by a method selected from a group consisting of said round forms being passed face-down and the perceiver being in a position as to be unable to see and unable to hear play; and said round forms being passed face-down and the perceiver being in a position as to be able to see and hear play; and said round forms being passed face-up and the perceiver being in a position as to be unable to see play and unable to hear play, and said round forms being passed face-up and the perceiver being in a position as to be unable to see play but able to hear play.

5. The method of claim 1 wherein the specified player presents the submitted perceptions of the round to the perceiver of the round by a method selected from a group consisting of, the perceiver being positioned so that she can see and hear a specified player, said specified player stating from memory or notes, or reading out-loud from round forms the name of a persona at-play, and the perceptions submitted to apply to said named persona at-play, said stating being done in such manner as to not suggest to the perceiver the identity of any player submitting a perception; and the perceiver being positioned so that he can hear but cannot see said specified player, said specified player stating, either from memory or notes, or reading out-loud from round forms, the name of a persona at-play, and the perceptions submitted to apply to said named persona at-play; and the perceiver being positioned so that she can not see said specified player, and said specified player copying said passed round forms and passing said copies of round forms to the perceiver.

6. The method of claim 1 further comprising, a) the perceiver being positioned so as to be unable to hear play, b) each player, other than the perceiver, stating to said specified player said each player's choice of said individually-read, or read-out-loud concomitant perceptions, or a self-composed perception, or a remembered perception, for each persona at-play, c) said specified player stating to the perceiver said each player's choice of said individually-read, or read-out-loud concomitant perceptions, or said self-composed, or remembered perception, and each persona at-play to whom said each player's choice of perception applies, d) the perceiver choosing one of said each player's choice of said individually-read, or read-out-loud concomitant perceptions, or said self-composed, or remembered perception for each persona at-play, e) each player whose choice of said individually read, or read-out-loud concomitant perceptions, or said self-composed, or remembered perception is chosen by the perceiver, being awarded a predetermined number of points.

7. The method of claim 1 wherein, a) said perceiver, possessing an apparatus with texting capability, and being positioned so that he can neither hear nor see the other players, and said other players possessing an apparatus with texting capability, b) each of said players confidentially submitting a round form to, or openly verbally stating to said specified player, said each player's choice of perception(s) to apply to said each persona at-play, c) said specified player texting to said perceiver the complete performance for the round, or texting said indicia designating word choices or personas, in the same sequence as said word choices or personas are presented in said randomly selected incomplete performance, and also texting the indicia of said each player's choice of perception(s) to apply to said each persona at-play, d) if said perceiver is not texted said complete performance for the round, said perceiver using said texted indicia and a copy of said incomplete performance to construct a complete performance for the round, e) said perceiver texting to said specified player said perceiver's choice of perception(s) to apply to said each persona at-play, f) awarding each of said players whose choice of perception(s) was chosen by the perceiver a predetermined number of points.

8. The method of claim 1 wherein the initiator for the next round of play is selected from a group of situations consisting of, when only one player submits the single chosen perception, or submits the majority of chosen perceptions, said only one player is the initiator of the next round; and when the initiator is one of two or more players submitting the same number of chosen perceptions, and no other player submits more chosen perceptions, said initiator continues as the initiator for the next round; and when two or more players, submit chosen perceptions, with one of the players submitting the greatest number of chosen perceptions, said player submitting the greatest number of chosen perceptions is the initiator for the next round; and when two or more players, none being the initiator, submit the same number of chosen perceptions, and no other player submitting a greater number of chosen perceptions, the initiator of the next round of play is determined by each of said two or more players, none being the initiator, drawing a card from the persona deck and the player drawing the highest-ranking card being the initiator for the next round.

9. The method of claim 1 wherein if it is a player's turn to be the Perceiver of the round and said player is also the winner of the previous round, and thereby the initiator of the round, the player whose turn follows the turn of said initiator of the round by a predetermined number of turns is the perceiver for round.

10. The method of claim 1 wherein each listed incomplete sequential performance and its list of concomitant perceptions is played sequentially as listed, with the perceiver and initiator for each performance being determined by the same method used for a performance that is not sequential.

11. The method of claim 1 further comprising one or more players consisting of a team of two or more players.

12. The method of claim 1 wherein each player bets chips on the perceiver choosing a perception said each player has submitted, said betting conforming to variable betting rules unanimously agreed upon by the players.

13. The method of claim 1 wherein after a predetermined number of rounds have been played the player with the highest number of points or chips is declared the winner of the game.

14. The awareness game of claim 1, played with a programmed inter-communicating system comprising servers, game consoles, tabletop computers, laptop computers, tablets, cell phones, and smart phones, said system executing routine game actions comprising generating a sequence of players' turns for a game, randomly selecting and displaying a performance and concomitant perceptions for a round of play, randomly selecting and displaying a persona(s) for a round of play, determining and displaying the perceiver and initiator for a round of play, and storing and displaying individual game actions, said individual game actions comprising a player choosing a performance for a round of play, the initiator making word choices, the initiator making persona choices, a player choosing a perception for each persona at-play in a round of play, a player presenting said choices of perception to the perceiver, and said perceiver choosing a perception for each persona at-play.

* * * * *